(12) United States Patent
Farkas et al.

(10) Patent No.: US 11,194,936 B2
(45) Date of Patent: Dec. 7, 2021

(54) SYSTEM AND METHOD FOR ANALYZING AND TESTING MULTI-DEGREE OF FREEDOM OBJECTS

(71) Applicant: THE BOEING COMPANY, Chicago, IL (US)

(72) Inventors: Michael A. Farkas, Hunstiville, AL (US); Adam L. Griswold, Garden Grove, CA (US); David R. Mahakian, Anaheim, CA (US); Justin McFatter, League City, TX (US); Benjamin H. Rothenberg, Costa Mesa, CA (US)

(73) Assignee: THE BOEING COMPANY, Chicago, IL (US)

( * ) Notice: Subject to any disclaimer, the term of this patent is extended or adjusted under 35 U.S.C. 154(b) by 396 days.

(21) Appl. No.: 16/107,738

(22) Filed: Aug. 21, 2018

(65) Prior Publication Data
US 2020/0065428 A1    Feb. 27, 2020

(51) Int. Cl.
*G06F 30/00* (2020.01)
*G06F 111/20* (2020.01)
*G06T 17/20* (2006.01)

(52) U.S. Cl.
CPC .......... *G06F 30/00* (2020.01); *G06F 2111/20* (2020.01); *G06T 17/20* (2013.01); *G06T 2210/21* (2013.01)

(58) Field of Classification Search
CPC ...... G06F 30/00; G06F 30/20; G06F 2111/20; G06T 17/20; G06T 2210/21
See application file for complete search history.

(56) References Cited

U.S. PATENT DOCUMENTS

| | | | |
|---|---|---|---|
| 5,953,977 A * | 9/1999 | Krishna | E02F 3/435 60/421 |
| 2003/0161390 A1* | 8/2003 | Teague | H04B 1/7117 375/148 |
| 2005/0045690 A1* | 3/2005 | Blankenship | B23K 37/0452 228/49.1 |

(Continued)

OTHER PUBLICATIONS

Extended European Search Report for Application No. 19179430.4 dated Jan. 17, 2020, 18 pgs.

(Continued)

*Primary Examiner* — Omar F Fernandez Rivas
*Assistant Examiner* — Bernard E Cothran
(74) *Attorney, Agent, or Firm* — Moore IP Law

(57) ABSTRACT

A system includes a processor and a memory coupled to the processor. The memory stores instructions that cause the processor to determine a first motion envelope of an object. The first motion envelope corresponds to a kinematic envelope of positions of the object which are achievable. The instructions also cause the processor to determine an operational envelope of the object based on an intersection of the first motion envelope and a second motion envelope of the object. The second motion envelope corresponds to a range of motion of the object constrained by dynamic motion limits of the object, and the operational envelope is indicative of a range of motion of the object during operation of the object. The instructions further cause the processor to generate a virtual model of the object based on the operational envelope. The virtual model is used to virtually model operation of the object.

20 Claims, 12 Drawing Sheets

(56) References Cited

U.S. PATENT DOCUMENTS

| | | | | |
|---|---|---|---|---|
| 2007/0174028 A1* | 7/2007 | Tillman | ............... | G06F 30/20 |
| | | | | 703/2 |
| 2008/0275593 A1* | 11/2008 | Johansson | ........... | B29C 45/7626 |
| | | | | 700/245 |
| 2011/0046783 A1* | 2/2011 | Benchikh | ............... | B25J 9/1671 |
| | | | | 700/254 |
| 2011/0093119 A1* | 4/2011 | Park | ..................... | B25J 9/1607 |
| | | | | 700/254 |
| 2019/0054620 A1* | 2/2019 | Griffiths | ................ | A61B 34/30 |

OTHER PUBLICATIONS

Juan Cortes: "Motion Planning Algorithms for General Closed-Chain Mechanisms," PhD Thesis dated Dec. 16, 2003, 170 pgs.

McMahon, Troy et al., "Sampling-Based Motion Planning with Reachable Volumes: Theoretical Foundations," 2014 IEEE Inernational Conference onRobotics & Automation (ICRA), May 31-Jun. 7, 2014, 8 pgs.

Moll, Mark, OMPL Gallery, <https://web.archive.org/web/20180519132245/http:/lompl.kavrakilab.org:80/gallery.html>, retrieved Dec. 20, 2019.

Simeon, T. et al., "Move3D a generic platform for path planning," Proceedings of the 4th IEEE International Symposium on Assembly and Task Planning, May 28-29, 2001, 6 pgs.

Wikipedia, "Bisection method" downloaded Dec. 20, 2019, 5 pgs.

"The world's leading content-creation engine," <https://unity3d.com/unity> retrieved Aug. 21, 2018, 1 pg.

* cited by examiner

SYSTEM AND METHOD FOR ANALYZING AND TESTING MULTI-DEGREE OF FREEDOM OBJECTS

GOVERNMENT LICENSE RIGHTS

The invention was made with Government support under Contract No. NAS15-10000 (CR-13642, CR15067) awarded by the National Aeronautics and Space Administration. The government has certain rights in this invention.

FIELD OF THE DISCLOSURE

The present disclosure is generally related to systems and methods for analyzing and testing multi-degree of freedom objects.

BACKGROUND

Objects that have multiple degrees of freedom are hard to virtually/analytically model because of the millions or billions of potential positions. Such objects, often include hardware-based motion limit devices, such as stops, limits, bumps, sensors, etc., to restrict movement of the object such that object does not experience a collision. Hardware-based motion limit devices add weight, volume, and complexity to the design. Additionally, a prototype of the object is often experimented with to determine where the hardware-based motion limit devices should be positioned. This adds time and cost to the design process.

SUMMARY

In a particular implementation, a system includes a processor and a memory coupled to the processor. The memory stores instructions that, when executed by the processor, cause the processor to determine a first motion envelope of an object. The first motion envelope corresponds to a kinematic envelope of positions of the object which are achievable by the object. The instructions also cause the processor to determine an operational envelope of the object based on an intersection of the first motion envelope and a second motion envelope of the object. The second motion envelope corresponds to a range of motion of the object constrained by dynamic motion limits of the object, and the operational envelope is indicative of a range of motion of the object during operation of the object. The instructions further cause the processor to generate a virtual model of the object based on the operational envelope. The virtual model is used to virtually model operation of the object.

In a particular implementation, a method includes determining a first motion envelope of an object. The first motion envelope corresponds to a kinematic envelope of positions of the object which are achievable by the object. The method also includes determining an operational envelope of the object based on an intersection of the first motion envelope and a second motion envelope of the object. The second motion envelope corresponds to a range of motion of the object constrained by dynamic motion limits of the object, and the operational envelope is indicative of a range of motion of the object during operation of the object. The method further includes generating a virtual model of the object based on the operational envelope. The virtual model is used to virtually model operation of the object.

In a particular implementation, a computer-readable storage device includes instructions, that when executed, cause a processor to perform operations including determining a first motion envelope of an object. The first motion envelope corresponds to a kinematic envelope of positions of the object which are achievable by the object. The instructions also cause the processor to perform operations of determining an operational envelope of the object based on an intersection of the first motion envelope and a second motion envelope of the object. The second motion envelope corresponds to a range of motion of the object constrained by dynamic motion limits of the object, and the operational envelope is indicative of a range of motion of the object during operation of the object. The instructions further cause the processor to perform operations of generating a virtual model of the object based on the operational envelope. The virtual model is used to virtually model operation of the object.

By generating a virtual model of an object, the object's operation through its operational envelope can be modeled virtually to determine and verify its operational envelope virtually. Determining and verifying the operational envelope virtually saves times and cost as compared to determining and/or verifying the operational envelope using a physical instance of the object and can reduce or eliminate hardware-based motion limit devices.

DETAILED DESCRIPTION

Figure 1:
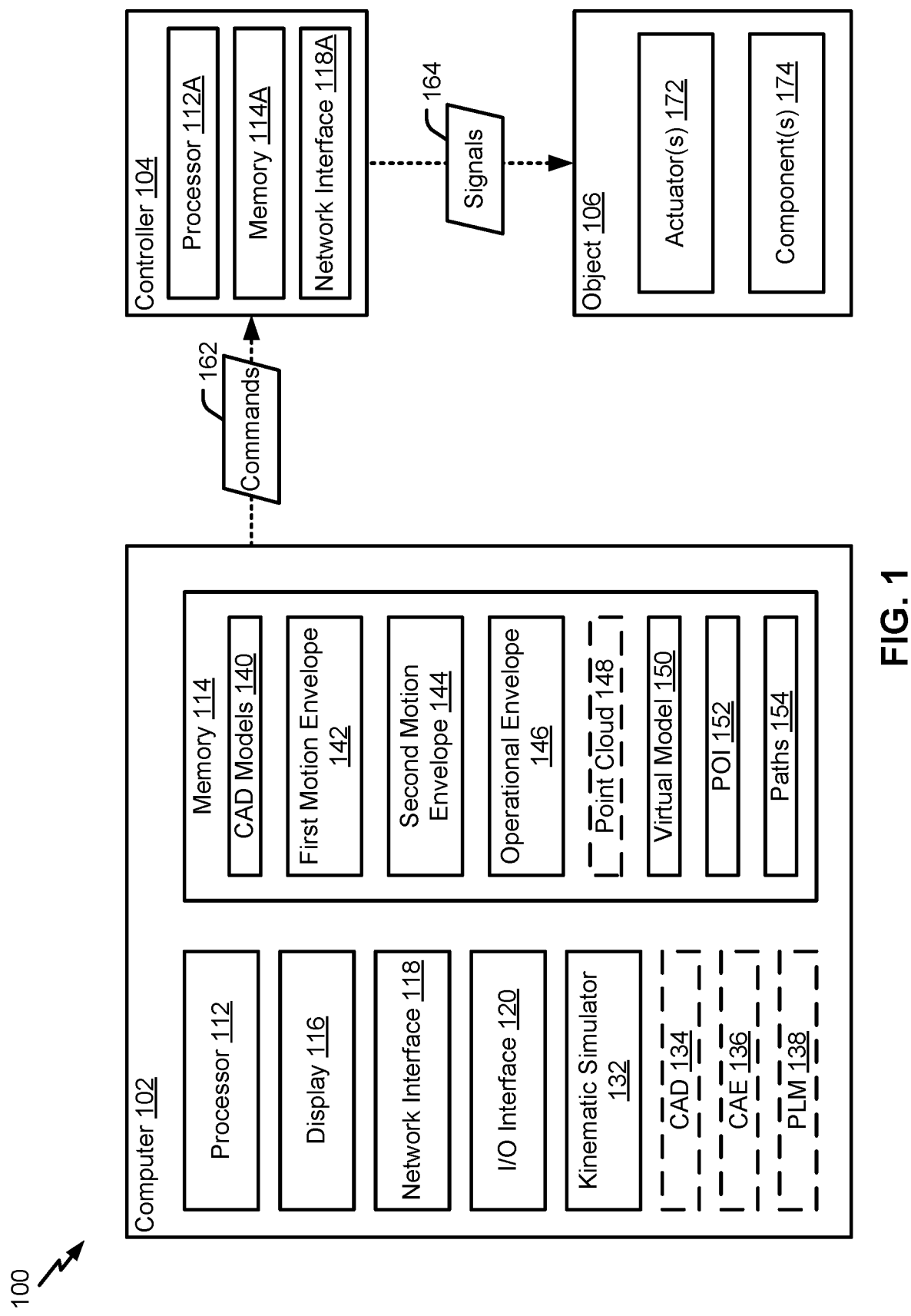
FIG. 1 is a block diagram that illustrates an example a system for analyzing and testing multi-degree of freedom objects.

The disclosed embodiments provide systems and methods for analyzing and testing multi-degree of freedom objects. The system includes an Interactive Visual Analytics and Simulation (IVAS) tool used to determine and/or validate (e.g., verify) operational envelopes (e.g., range of motion) of objects, such as multi-degree of freedom objects. The IVAS tool is a real-time, interactive application which uses kinematic simulation (e.g., a video game engine) to synthesize 3D product data (e.g., Computer-Aided Design (CAD) models) with analysis tools (e.g., Computer-Aided Engineering (CAE) data and/or Product Lifecycle Management (PLM) data) to visualize complex systems and datasets. The IVAS tool can model mechanism kinematics, component dynamics, and illustrate integrated system operational sequences with data from traditional modeling and simulation applications.

The IVAS tool can utilize full or simplified representations of 3D geometry of an object derived from CAD programs, e.g., CAD models. The IVAS tool can test positions of an object and prescribed hardware limits of the object (such as stroke length limits and/or joint angle limits of actuators of the object) virtually to detect collisions. For example, each potential position of the object can be used to generate an inner and outer-most boundary of the object to accumulate a motion envelope of all boundary positions to define a kinematic envelope (e.g., a kinematic range-of-motion (ROM)). A dynamic envelope (e.g., a dynamic ROM) is then determined from the extreme positions of the object using dynamic motion limits defined by the prescribed end use application limits (e.g., a Vehicle Relative Dynamic Motion (VRDM) limits table). An operational envelope (e.g., an operational ROM) is then generated based on the intersection of surface boundaries of the kinematic envelope and the dynamic envelope. The operational envelope includes all possible positions that the object can achieve during operation and is determined analytically (e.g., virtually). The operational envelope can set hardware-based motion limit devices, set software-based motion limits, or a combination thereof. Accordingly, an operational envelope of a multiple degree of freedom object can be generated analytically and independent of manipulating a physical instance of the object 106.

Additionally, the operational envelope can be used to test or verify the operational envelope, i.e., perform an Operational Range of Motion test, such as a Range of Motion test as required by National Aeronautics and Space Administration (NASA). For example, the operational envelope can be tested virtually and/or physically (e.g., manipulate a physical instance of the object). The operational envelope is used to generate a motion cloud of the object, i.e., a visual representation of the operational envelope of the object. Point clouds (e.g., outlines) of components of the object can be generated based on the motion cloud. Meshes of the components of the object are generated based on the point clouds. The meshes of the components of the object make up a virtual model of the object and are manipulated by the IVAS tool (e.g., a kinematic simulator thereof, such as a video game engine) to test collisions. For example, the virtual model is virtually manipulated or moved along movement paths from an origin, default, or starting position to various points of interest by the kinematic simulator to test points along the movement path. Instead of testing every point in the operational envelope, which may take a significant amount of time for complex objects, points of interest may be used to test various points of the operational envelope. The points of interest may be chosen by the IVAS tool or a user thereof. The points of interest (or areas of interest) often correspond to positions of the object near boundaries of moving components of the object, such as boundaries of actuator envelopes. By manipulating the virtual model along the movement paths and checking each point, collisions can be detected (or the absence of collisions can be determined) by the IVAS tool using the kinematic simulator.

Collisions can be defined as when one component collides (touches) another component or when a minimal distance between a surface of a component of the object and either another surface of another component of the object or another object is satisfied. A Graphical User-Interface (GUI) and display allow the user to view real-time object parameters, object positions, and collision boundaries during simulation of the object. After the object has been modeled virtually, a physical instance of the object can be used to verify or validate both the operational envelope and movement paths determined by the IVAS tool. The IVAS tool (or another device) can generate commands and/or signals based on the movement paths. The signals cause the physical instance of the object to move along the movement paths to verify the movement paths are free from collisions.

Accordingly, virtually determining and verifying the operational envelope of the object virtually saves time and cost as compared to determining and/or verifying the operational envelope using a physical instance of the object and can reduce or eliminate the use of hardware-based motion limit devices on the object.

FIG. 1 illustrates a block diagram of an example of a system 100 for analyzing and testing multi-degree of freedom objects, such as the object 106. The system 100 includes a computer 102, a controller 104, and the object 106 (i.e., a physical instance of the object 106). The computer 102 may include or correspond to an IVAS tool.

The computer 102 includes a processor 112, a memory 114, a display 116, a network interface 118, an input/output (I/O) interface 120, and a kinematic simulator 132. The processor 112 is coupled to the memory 114 and is configured to execute instructions stored in the memory 114.

The display 116 (e.g., a display device) is configured to output a GUI responsive to signals generated by the processor 112 and/or a graphics processing unit (GPU) thereof (not shown). The network interface 118 includes or corresponds to a wired networking interface, a wireless networking interface, or a combination thereof, and is configured to communicate with other devices, such as the controller 104, the object 106, or both, via a network.

The kinematic simulator 132 is configured to manipulate a virtual model 150 of the object 106 to virtually model operation of the object 106 (e.g., to determine that the operational envelope 146 is free of collisions). In some implementations, the kinematic simulator 132 includes or corresponds to a physics engine or a video game engine. As illustrative, non-limiting examples, the video game engine may include or correspond to the Unity Game Engine, a registered trademark of Unity Technologies, or the Unreal 4 Game Engine, a registered trademark of Epic Games, Inc.

The controller 104 includes a processor 112A, a memory 114A, and a network interface 118A. The controller 104 is configured to receive commands 162 from the computer 102 and to generate signals 164 based on the commands 162. The signals 164 are configured to move the object 106 along the movement paths 154 (e.g., the collision-free movement paths). Although the system 100 includes the controller 104 separate from the computer 102, in other implementations, the system 100 does not include a separate controller 104 and the computer 102 generates the signals 164 based on the commands 162.

The object 106 is a multiple degree of freedom object, i.e., the object 106 or parts thereof can move in multiple degrees of freedom. The object 106 includes one or more actuators 172 and one or more components 174. As an illustrative non-limiting example, the object 106 is a docking system 502, as illustrated in FIG. 5. In such implementations, the actuators 172 include linear actuators with an adjustable stroke length and upper and lower pivots forming upper and lower joint angles.

The object 106 is configured to move itself along the movement paths 154 responsive to receiving the signals 164. For example, the one or more actuators 172 are activated and controlled based on the signals 164. To illustrate, the signals 164 cause the one or more actuators 172 to move (e.g., rotate and/or extend), which moves the one or more components 174 and the object 106.

During design of the object 106, such as during testing and validation of the object 106, the operational envelope 146 of the object 106 can be determined and validated analytically. For example, the processor 112 of the computer 102 determines a first motion envelope 142 of the object 106. The first motion envelope 142 includes or corresponds to a kinematic envelope of positions of the object 106 which are achievable (e.g., physically achievable) by the object 106. The first motion envelope 142 is determined analytically (e.g., virtually), such as by using kinematic constraints and CAD models 140. The CAD models 140 include or correspond to engineering models of the object 106 and parts thereof (e.g., the actuators 172 and the components 174). In some implementations, the CAD models 140 include or correspond to simplified models of the object 106 and parts thereof (e.g., the actuators 172 and the components 174). The CAD models 140 may be generated by the CAD application 134 or received by the computer 102. The CAD models 140 may be converted to be compatible with the kinematic simulator 132. The first motion envelope 142 is not generated by physically moving the object 106 (i.e., the physical instance of the object 106). To illustrate, the CAD models 140 are manipulated by the kinematic simulator 132 according to kinematic constraints to determine if the position is achievable by the CAD models 140. In some implementations, the processor 112 employs a binary search algorithm to determine the first motion envelope 142. Determination of the first motion envelope 142 is further described with reference to FIG. 7.

The processor 112 of the computer 102 determines a second motion envelope 144 of the object 106. The second motion envelope 144 includes or corresponds to a range of motion of the object 106 constrained by dynamic motion limits of the object 106, a dynamic range of motion or dynamic motion envelope. In some implementations, the dynamic motion limits include or correspond to operational or design limits (e.g., design requirements). For example, the dynamic motion limits of the object 106 correspond to VRDM limits and are included in a VRDM limits table received by the computer 102. In such implementations, the processor 112 generates the second motion envelope 144 of the object 106 based on the VRDM limits table. The second motion envelope 144 is determined analytically (e.g., virtually), such as by using dynamic constraints and the CAD models 140. For example, the CAD models 140 are manipulated by the kinematic simulator 132 according to dynamic constraints (e.g., the dynamic motion limits) to determine if the position is achievable by the CAD models 140. Determination of the second motion envelope 144 is further described with reference to FIG. 8.

The processor 112 of the computer 102 determines the operational envelope 146 of the object 106 based on an intersection of the first motion envelope 142 and the second motion envelope 144. For example, the operational envelope 146 includes all points formed by (e.g., contained within) an intersection of surface boundaries of the first motion envelope 142 and the second motion envelope 144. The operational envelope 146 is indicative of a range of motion of the object 106 during operation of the object 106. The operational envelope 146 is determined analytically (e.g., virtually), such as by using kinematic constraints, dynamic constraints, and the CAD models 140. For example, the CAD models 140 are manipulated by the kinematic simulator 132 according to kinematic and dynamic constraints (e.g., the dynamic motion limits) to determine if the position is achievable by the CAD models 140. Determination of the operational envelope 146 is further described with reference to FIG. 7. In some implementations, the processor 112 determines a motion cloud based on the operational envelope 146. The motion cloud is a visual representation of the operational envelope 146 of the object 106. To illustrate, the processor 112 uses the kinematic simulator 132 to generate the motion cloud based on the operational envelope 146 and/or the CAD models 140.

The processor 112 of the computer 102 generates the virtual model 150 of the object 106 based on the operational envelope 146 and/or the motion cloud. For example, the processor 112 generates a point cloud 148 of the object 106 based on the operational envelope 146 or the motion cloud. The point cloud 148 may include point clouds 148 of each of the actuators 172 and the components 174, such as point clouds 314, 316 of FIG. 3. The virtual model 150 differs from the CAD models 140 in that the virtual model 150 is composed of meshes. A mesh may include or be defined by a set of vertices, edges, faces, polygons and/or surfaces, and the mesh defines or represents the shape of the component or the object in 3D computer graphics and solid modeling. The faces of the mesh may include triangles, quadrilaterals, convex polygons, concave polygons, or polygons with holes. Additionally, the CAD models 140 are generally parametrically defined and represent parts of the object 106 in some static configuration. The virtual model 150 can be manipulated to move within the motion cloud, which represents the space that the object 106 could occupy during operation. The virtual model 150 is non-parametrically defined and includes many surfaces that represent minimum internal surfaces and maximum outside surfaces. The virtual model 150 is a simplified, tessellated object model (i.e., non-parametric model) derived from the CAD models 140. The virtual model 150 is generated based on point clouds (e.g., the point clouds 314, 316), as described further with reference to FIGS. 3 and 4.

The operational envelope 146 and the virtual model 150 of the object 106 enable a Range of Motion test to be performed on the object, virtually and/or physically. Points of interest 152 are determined based on the operational envelope 146. For example, a user or the computer 102 may generate the points of interest 152 based on or corresponding to degrees of freedom of the object 106. To illustrate, the one or more actuators 172 of the object 106 have corresponding degrees of freedom. The user or the computer 102 may identify one or more points of interest 152 within the operational envelope 146 that correspond to limits of the one or more actuators 172 by designating positions of the object 106 within the operational envelope 146 where the actuators 172 are at or near a particular limit as the one or more points of interest 152.

The processor 112 of the computer 102 generates one or more movement paths 154 for the object 106 based on the points of interest 152. For example, the processor 112 generates one or more movement paths 154 to arrive at a particular point of interest 152 from an initial position (e.g., an origin or default position). As an illustrative non-limiting example, for a docking system 502 illustrated in FIG. 5, the initial position corresponds to a ready-to-capture position.

The processor 112 of the computer 102 determines whether the one or more movement paths 154 to arrive at the point of interest 152 from the initial position are free from collisions. For example, the processor 112 of the computer 102 uses the kinematic simulator 132 to manipulate the virtual model 150 from the initial position along the one or more movement paths 154 to the point of interest 152.

The processor 112 of the computer 102 outputs a result of determining whether the one or more movement paths 154 to arrive at the point of interest 152 are free from collisions. For example, the processor 112 generates a visual notification for display on the display 116 or generates a file indicating that the points of interest 152 and/or the movement paths 154 are free from collision. To illustrate, at each position along the one or more movement paths 154, the processor 112 determines that surfaces of the virtual model 150 do not violate a collision threshold (e.g., a minimum distance between surfaces). Based on determining that at each position along the one or more movement paths 154 surfaces of the virtual model 150 do not violate the collision threshold, the processor 112 outputs a visual notification. The processor 112 may determine whether or not a collision was detected based on the collision detection process described with reference to step 710 of FIG. 7.

Additionally or alternatively, the processor 112 generates the commands 162, indicative of collision-free movement paths of the object 106 through the operational envelope 146, based on the virtual model 150. The processor 112 sends the commands 162, via the network interface 118 and the network, to the network interface 118A of the controller 104. The controller 104 (e.g., the processor 112A thereof) generates the signals 164 based on the commands 162 and sends the signals 164, via the network interface 118A and the network, to the object 106. Alternatively, the processor 112 of the computer 102 generates the signals 164 based on the commands 162 and sends the signals 164, via the network interface 118, to the object 106.

In some implementations, the computer 102 further includes a computer-aided design (CAD) application 134, a computer-aided engineering (CAE) application 136, a product lifecycle management (PLM) application 138, or a combination thereof. In a particular implementation, one or more of the applications 134-138 can be used to generate the second motion envelope 144. Additionally, data associated with one or more of the applications 134-138 and corresponding to the object 106 can be integrated or imported into the kinematic simulator 132. For example, model data of the CAD application 134 and corresponding to the object 106 can be used to generate the virtual model 150. To illustrate, CAD files and data of the CAD application 134 are converted into files and data compatible with the kinematic simulator 132, i.e., the CAD models 140. In some implementations, the virtual model 150 is or corresponds to a simplified version of the object 106. For example, the virtual model 150 may omit one or more components 174 that will not cause collisions (e.g., components 174 that do not move relative to the object 106 or a portion thereof) or flexible components 174. Additionally or alternatively, the virtual model 150 may alter or approximate one or more components 174 by replacing complex shapes and surfaces of the one or more components 174 with simpler shapes and surfaces. To illustrate, surface details like indentations or recesses can be omitted and a smooth surface can be used instead. As another illustration, surfaces with compound curves can be replaced with straight surfaces or surfaces with non-compound curves. The virtual model 150 enables the kinematic simulator 132 to perform collision detection. The kinematic simulator 132 may not be able to perform collision detection with the CAD models 140 (e.g., manipulate the CAD models 140 to various positions) and/or the CAD models 140 are too complex such that manipulating the CAD models 140 to test the movement paths 154 would be impractical.

Figure 2:
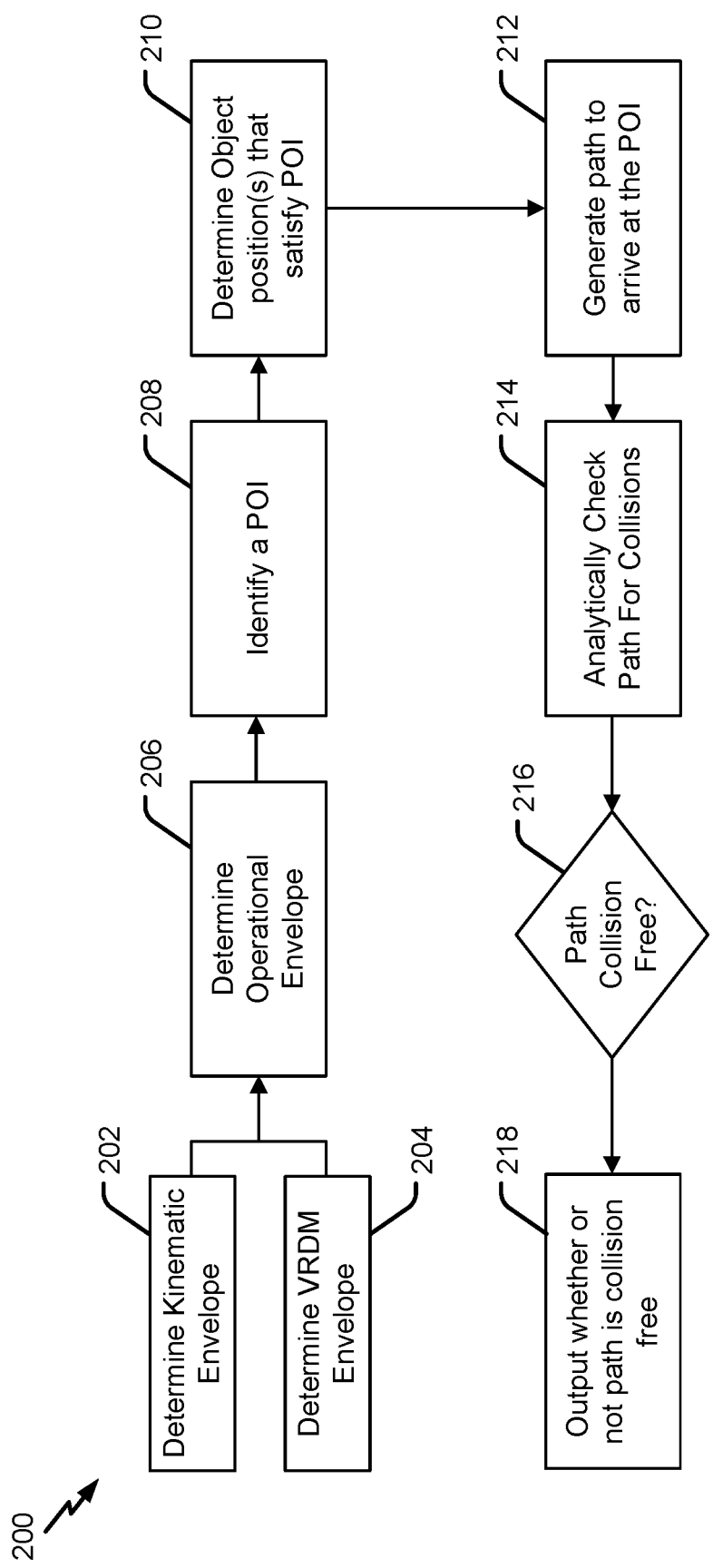
FIG. 2 is a flow chart of an example of a method of analyzing and testing multi-degree of freedom objects performed by the system of FIG. 1.

FIG. 2 is a flow chart 200 of an example of a method of analyzing and testing multi-degree of freedom objects performed by the system 100 of FIG. 1. The method represented by the flow chart 200 may be performed by the system 100 of FIG. 1, such as the processor 112.

At 202, the system 100 determines a kinematic envelope, such as the first motion envelope 142 of FIG. 1. In a particular implementation, the kinematic envelope includes potential object 106 positions (e.g., potential positions of a component 174 thereof) determined by parameterizing multiple parameters of the object 106. As an illustrative, non-limiting example, when the object 106 corresponds to the docking system 502 of FIG. 5, the multiple parameters include roll angle, wobble angle, wobble direction, standoff, radial direction, or a combination thereof. The kinematic envelope includes the maximum extent or position of the object 106 physically possible based on the parameters.

At 204, the system 100 determines a VRDM envelope, such as the second motion envelope 144 of FIG. 1. For example, the computer 102 receives the VRDM envelope or the computer 102 generates the VRDM envelope based on a received VRDM limits table. In some implementations, the VRDM limits table is indicative of design specification values, such as motion limits deemed acceptable by the end user. The VRDM limits table indicates maximum and minimum values of one or more parameters of the object 106. For example, the VRDM limits table indicates maximum and minimum values for wobble angle, roll angle, radial misalignment angle, standoff distance, or a combination thereof. In a particular implementation, the VRDM limits table corresponds to design specification requirements. For example, the maximum and minimum values of the parameters of the VRDM limits table correspond to values which achieve a particular design specification requirement.

At 206, the system 100 determines the operational envelope 146 of FIG. 1. The operational envelope 146 includes positions of the object 106 determined by parameterizing one or more parameters, such as the roll, wobble, wobble direction, standoff, radial direction, or a combination thereof, and finding the maximum extent or position of the object 106 physically possible based on those parameters that does not violate the VRDM table limits. The operational envelope 146 may be determined by placing the CAD models 140 of the object 106 (e.g., a particular component 174 thereof) at various positions along a vector determined by the one or more parameters and testing if there is a collision or constraint violation at that position.

A binary search method can be used to determine boundaries of the operational envelope 146. For example, the binary search method iteratively checks positions between a known valid position (i.e., positions that do not result in a collision or constraint violation) and known invalid positions (i.e., positions that result in a collision or a constraint violation) to determine valid positions (e.g., a last valid position) that do not result in a collision or a constraint violation and which are within a threshold distance (e.g., tolerance) from an invalid position (e.g., a last invalid position) which results in a collision, constraint violation, or both. Each iteration checks a position (e.g., a halfway position) between a last valid position and a last invalid position for a collision or a constraint violation. If a checked position is valid, then the checked position becomes the last valid position. Alternatively, if a checked position is invalid, then the checked position becomes the last invalid position.

To illustrate, the binary search method initializes a last valid position with a known valid position, such as starting or docked position, and a last invalid position with a known invalid position, such as an initial invalid position. A first position is chosen halfway between the last valid position (e.g., the starting position) and the last invalid position (e.g., the initial invalid position). The first position is tested to determine if there are any collisions or constraint violations. If there are no collisions or constraint violations, then the first position is classified as a valid position and is set as a new or updated "last valid position," and the object 106 is positioned (e.g., repositioned) halfway between the updated last valid position (i.e., the first position) and the last invalid position (i.e., the initial invalid position). Alternatively, if a collision occurs or a constraint is violated at the first position, then the first position is classified as an invalid position and is set as a new or updated "last invalid position," and the object 106 is positioned (e.g., repositioned) halfway between the last valid position (i.e., the starting position) and the updated last invalid position (i.e., the first position). This process is repeated or iterated until a distance between the nearest valid and invalid points is less than a threshold distance.

Figure 9:
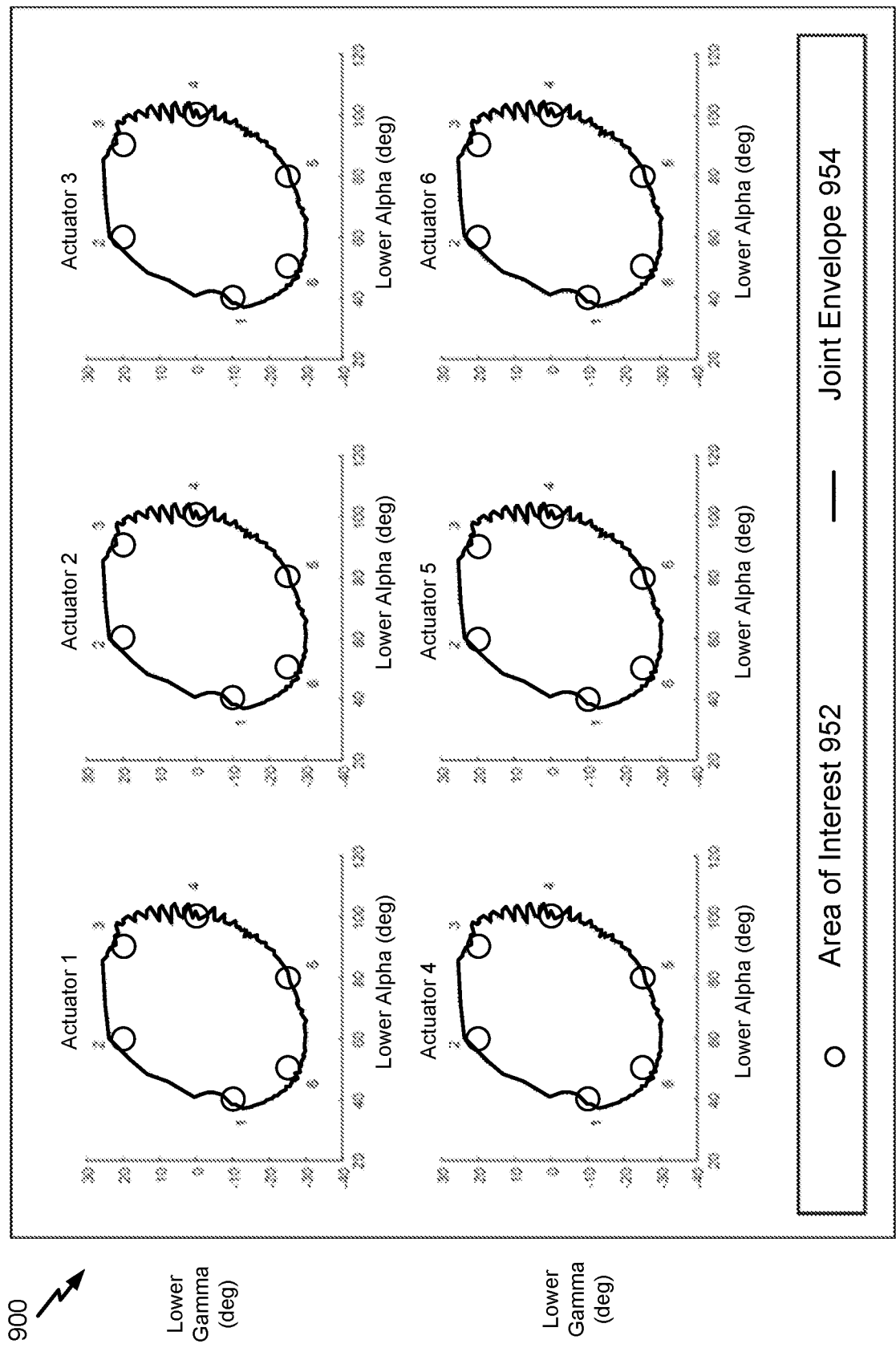
FIG. 9 is a diagram that illustrates points of interest and actuator envelopes.

At 208, the system 100 identifies a point of interest 152 in the operational envelope 146. For example, the processor 112 of the computer 102 determines at least one point of interest 152 near a boundary of the operational envelope 146. To illustrate, the processor 112 determines a particular point of interest 152 near a boundary of an operational envelope of a particular actuator 172 (e.g., a joint envelope 954 of FIG. 9) of the object 106. The point of interest 152 may be within the operational envelope 146 and/or the joint envelope 954, on the boundary of the operational envelope 146 and/or the joint envelope 954, or outside of the operational envelope 146 and/or the joint envelope 954. In a particular implementation, the point of interest 152 is related to a parameter (e.g., stroke length, force, or joint angle) of the particular actuator 172 of the object 106. For example, the point of interest 152 corresponds to a point near a boundary of a joint angle envelope of the actuator 172, as illustrated in FIG. 9.

Alternatively, a user designates or identifies one or more points of interest 152 to the system 100. In some implementations, the user or the system 100 identifies a plurality of potential points of interest (e.g., an area of interest) within the operational envelope 146. In such implementations, the user or the system 100 selects a particular potential point of interest 152 of the plurality of potential points of interest as the point of interest 152 based on a position of the particular potential point of interest 152 overlapping with positions of multiple potential points of interest of the potential points of interest. To illustrate, a position of the virtual model 150 of the object 106 which satisfies first conditions of the particular potential point of interest 152 further satisfies second conditions of multiple potential points of interest of the potential points of interest. In a particular implementation, the position of the virtual model 150 of the object 106 is defined with respect to a particular component of the object 106. For example, the position of the virtual model 150 correspond to a position of the particular component of the object 106.

At 210, the system 100 determines one or more positions of the object 106 that satisfies the point of interest 152 (e.g., satisfies the conditions thereof). When the point of interest 152 corresponds to a point of interest 152 of a joint envelope of a particular actuator 172 and represents joint angles of the particular actuator 172, the object 106 can achieve multiple positions while the particular actuator 172 is fixed at the joint angles of the point of interest 152, i.e., the joint angles of the positions satisfy joint angles conditions of the point of interest 152. Alternatively, when the point of interest 152 corresponds to a particular position of the object 106, a particular component 174 (e.g., a docking ring 514 of FIG. 5) of the object 106 may achieve the particular position and satisfy the point of interest 152 when a center position or an edge position of the particular component 174 is at the particular position. Multiple unique combinations of positions of the actuators 172 can result in the center position or the edge position of the particular component 174 satisfying the point of interest 152.

For each of the one or more positions of the object 106 that satisfies the point of interest 152, the processor 112 determines positions and boundaries of the actuators 172 and the components 174 of the object 106 using the kinematic simulator 132 and the virtual model 150. To illustrate, the processor 112 employs inverse kinematics to determine the positions and the boundaries of the actuators 172 and the other components 174 of the object 106 based on the one or more positions of the particular component 174 (e.g., the docking ring 514) of the object 106 that satisfy the point of interest 152. Alternatively, the processor 112 employs forward kinematics to determine the one or more positions of the particular component 174 (e.g., the docking ring 514) of the object 106 based on the positions and the boundaries of the actuators 172 and the other components 174 of the object 106 that satisfy the point of interest 152.

At 212, the system 100 generates one or more movement paths 154 to arrive at the point of interest 152. For example, the processor 112 of the computer 102 determines one or more origins (e.g., starting positions) and determines a movement path 154 from each origin of the one or more origins to the one or more positions of the object 106 that satisfy the point of interest 152. The one or more movement paths 154 each include a plurality of positions from the corresponding origin to the point of interest 152. The one or more origins can be selected by a computer (e.g., randomly or pseudo-randomly) or may be input by the user. In a particular implementation, the one or more origins correspond to default and/or operating positions. To illustrate, in the docking system example, the one or more origins may include a stowed position, the ready to capture position, or both.

At 214, the system 100 analytically determines whether the one or more movement paths 154 are free of collisions. For example, the processor 112 of the computer 102 determines whether the one or more movement paths 154 to arrive at the point of interest 152 from an initial position (e.g., the one or more origins) are free from collisions. To illustrate, the processor 112 manipulates and moves the virtual model 150 in the kinematic simulator 132 along the one or more movement paths 154. At each point along the one or more movement paths 154, the processor 112 checks for a collision. For example, the processor 112 computes distances between surfaces of the object 106 or between a surface of the object 106 and a surface of another object and compares the distances to a threshold distance.

At 216, the system 100 determines whether the one or more movement paths 154 are collision free. For example, the processor 112 manipulates the virtual model 150 along the one or more movement paths 154 and performs one or more operations using the kinematic simulator 132 to determine if each point along the one or more movement paths 154 is collisions free. To illustrate, the processor 112 performs a coarse collision detection operation, a fine collision detection operation, or both. In some implementations, the processor 112 performs the coarse collision detection operation prior to performing the fine collision detection operation. The coarse collision detection operation can be performed based on constraints of the object 106, such as kinematic constraints and/or operational constraints. For example, the virtual model of the object 106 is compared to the constraints (e.g., conditions or values) to see if a value of the virtual model violates the constraints, as described further with reference to step 710 of FIG. 7. The fine collision detection operation can be performed based on distances between surfaces of the virtual model 150 of the object 106, such as kinematic constraints and/or operational constraints, as described further with reference to step 710 of FIG. 7.

At 218, the processor 112 outputs a result in response to determining whether the one or more movement paths 154 are collision free. In some implementations, the processor 112 generates data indicating which paths are collision free. To illustrate, the processor 112 outputs a visual notification to a display (e.g., the display 116 of FIG. 1) or generates a file that indicates which paths are collision free and/or which paths result in collisions. Additionally or alternatively, the processor 112, generates the commands 162 and/or the signals 164 of FIG. 1 based on determining whether the one or more movement paths 154 are collision free. In a particular implementation, the processor 112 generates the commands 162 and/or the signals 164 based on the file.

Figure 3:
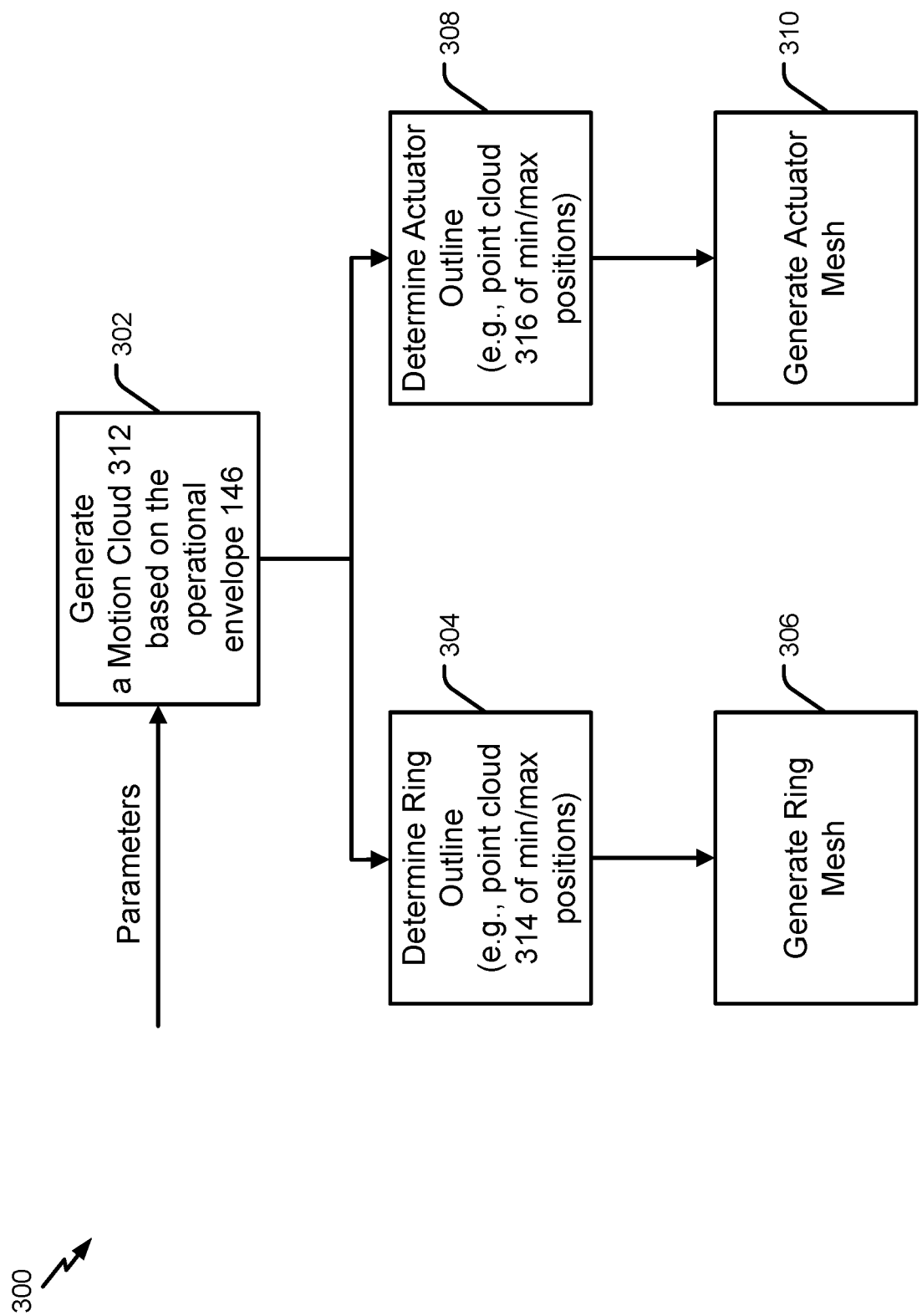
FIG. 3 is a flow chart of an example of a method of generating a virtual model.

FIG. 3 is a flow chart 300 of an example of a creating a virtual model, such as the virtual model 150 of FIG. 1. The method represented by the flow chart 300 may be performed by the system 100 of FIG. 1, such as the processor 112. In FIG. 3, the virtual model 150 is generated based on a motion cloud 312, which is generated based on the operational envelope 146 of FIG. 1, and CAD data from the CAD application 134. The virtual model 150 includes multiple part meshes, e.g., meshes of the actuators 172 and the components 174 that make up the object 106.

At 302, the motion cloud 312 is generated based on the operational envelope 146. For example, the kinematic simulator 132 generates a visual representation of the operational envelope 146 of the object 106, as illustrated in FIG. 6. After the motion cloud 312 is generated, multiple component outlines (e.g., point clouds 314, 316) are generated based on maximum and minimum points of the motion cloud 312, as described further with reference to FIGS. 4 and 5. Alternatively, the operational envelope 146 can be used to generate the multiple component outlines (e.g., point clouds 314, 316) independent of the motion cloud 312.

In FIG. 3, the processor 112 generates, at 304, a ring outline of a particular component 174 (e.g., the docking ring 514 of FIG. 5) of the object 106 and generates, at 308, an actuator outline of one or more actuators 172 of the object 106.

After the outlines (e.g., the point clouds 314, 316) of the components 174 of the object 106 are generated, meshes of the outlines are generated based on the outlines. In the example illustrated in FIG. 3, the processor 112 generates, at 306, a ring mesh of the object 106 and generates, at 310, an actuator mesh of the object 106. For example, the processor 112 converts parametric surfaces of a CAD model 140 of a particular actuator 172 or component 174 into polygonal surfaces for the meshes of the particular actuator 172 or component 174 of the virtual model 150. To illustrate, the processor 112 tessellates a polygonal shape, such as a triangle, to cover the parametric surfaces. In some implementations, the component outlines (e.g., the point clouds 314, 316) are converted into meshes readable by the kinematic simulator 132. The meshes may be represented as a .STL file or a .FBX file, as illustrative, non-limiting examples.

In a particular implementation, one or more outlines or meshes may be reproduced or copied to complete the virtual model 150 of the object 106. For example, as the object 106 includes multiple actuators 172, the actuator outline or the actuator mesh of a particular actuator 172 may be reproduced to generate the actuator outlines or the actuator meshes of the other actuators 172. As a non-limiting illustration, the object 106 includes six actuators and two actuator types (e.g., a first type and a second type). Two actuator outlines, one corresponding to each actuator type, are generated and two actuator meshes are generated from the two actuator outlines. The two actuator meshes, one corresponding to each actuator type, can be reproduced to generate the six actuator meshes of the virtual model 150.

Figure 4:
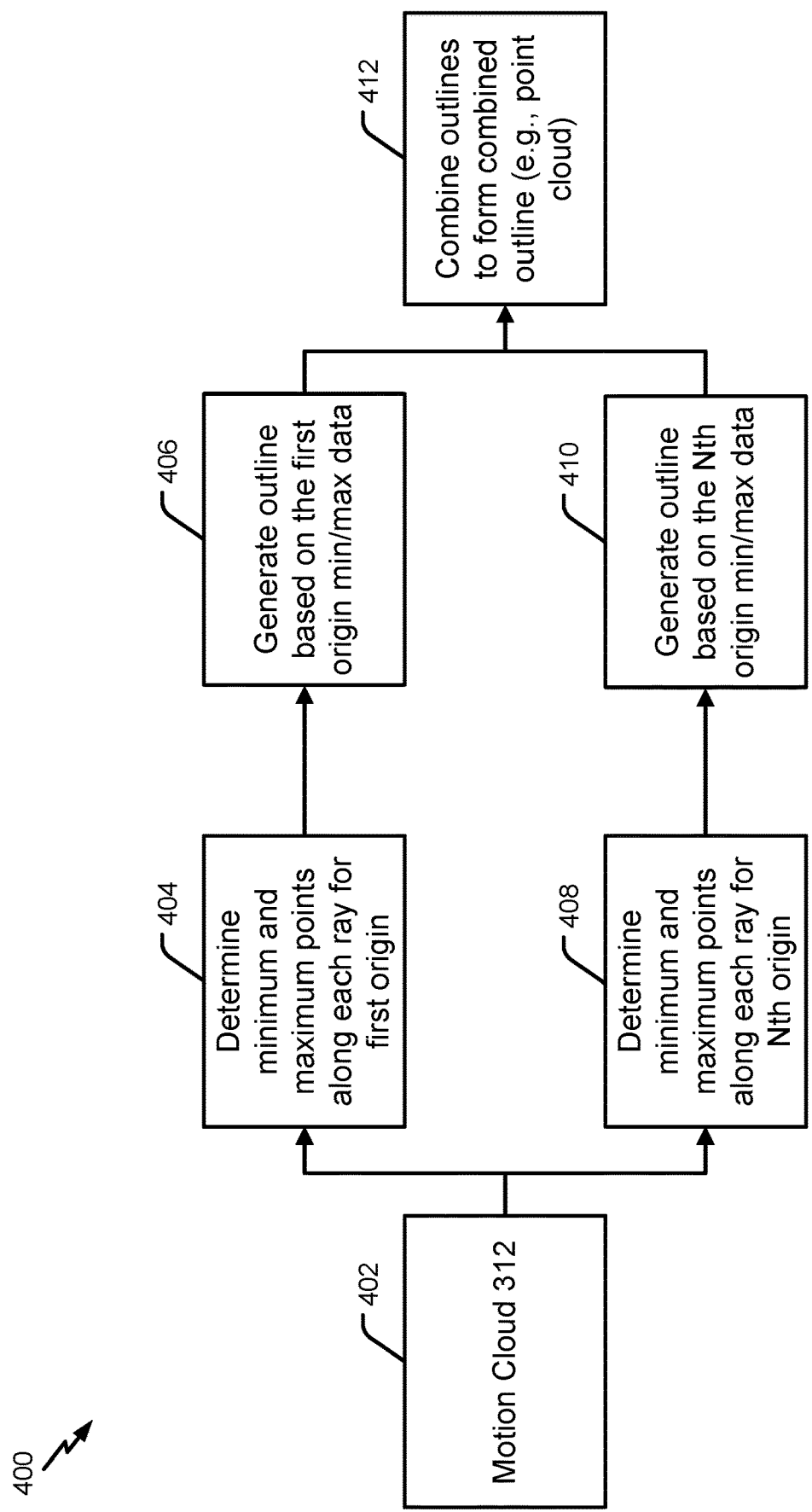
FIG. 4 is a flow chart of an example of a method of generating a part outline.

FIG. 4 is a flow chart 400 of an example of a method of generating a part outline (e.g., a point cloud 314, 316). The method represented by the flow chart 400 may be performed by the system 100 of FIG. 1, such as the processor 112. In FIG. 4, the part outline (e.g., the ring outline or the actuator outline generated in FIG. 3 at 304 and 308) is generated based on the motion cloud 312 (which is generated based on the operational envelope 146 and the CAD models 140 of FIG. 1).

The part outline (e.g., the point cloud 314, 316) corresponds to a surface of a boundary of physical space reached by the part of the object 106. In a particular implementation, the process is performed using spherical coordinates (e.g., azimuth and elevation). For example, a 3D space is divided into partitions of 0.5° by 0.5° and points of the virtual model 150 are tracked to find the closest and farthest points (i.e. the minimum and maximum distance) to an origin.

The processor 112 defines multiple origins within the operational envelope 146. As illustrated in FIG. 4, the multiple origins including a first origin and an Nth origin (e.g., a second origin, a third origin, etc.). Each origin of the multiple origins is associated with a plurality of rays emanating from the origin and extending to a boundary of the operational envelope 146. In some implementations, the multiple origins are evenly spaced from one another. In a particular example, each origin of the multiple origins is spaced equally from adjacent origins around a sphere. Using more origins reduces gaps in the point cloud.

The processor 112 determines minimum and maximum points (minimum and maximum vertices) for each ray of each origin that intersect the boundary of the operational envelope 146 or the motion cloud. For example, the processor 112, at 404 determines a minimum point and a maximum point of intersection with the boundary of the motion cloud for each ray of a first plurality of rays corresponding to the first origin, and the processor 112, at 408, determines a minimum point and a maximum point of intersection with the boundary of the motion cloud for each ray of a second plurality of rays corresponding to the Nth origin. As the rays emanate from an origin and terminate at the boundary of the motion cloud, the maximum and minimum points of each ray correspond to the two points (i.e., vertices) on the boundary of the operational envelope 146 where the ray intersects the boundary of the motion cloud, as illustrated in FIG. 5. The maximum and minimum points are associated with a minimal interior point and a maximal exterior point that the object 106 or a particular part of the object 106 can travel between for each ray.

To illustrate, for each point (e.g., a last valid position found by a binary search algorithm) on the boundary of the operational envelope 146, the processor 112 transforms a set of all vertices of the polygons of the surfaces of the meshes of the virtual model 150 to match a position and an orientation of the last valid position, computes coordinates (e.g., the azimuth and the elevation) for each vertex of the set of all vertices (e.g., each corner of the triangles that form a surface of the meshes), computes a distance from each vertex to the origin, compares the distances of each vertex to determine which vertex has a minimum distance and which vertex has a maximum distance, and generates a minimum vertex and a maximum vertex for each ray based on the vertex that has the minimum distance and the vertex that has the maximum distance.

The set of minimum and maximum vertices corresponds to a surface outline (i.e., the inner and outer surface) of the envelope of the component for the origin. For example, the processor 112, at 406, generates a first surface outline based on the minimum point and maximum point of each ray of the first plurality of rays and, at 410, generates a second surface outline based on the minimum point and the maximum point of each ray of the second plurality of ray.

The processor 112 combines the minimum vertices and the maximum vertices from each origin to generate the part outlines (e.g., the point cloud 314, 316). For example, the processor 112, at 412, combines the first surface outline and the second surface outline to generate a particular combined outline of a particular component (e.g., the point cloud 314, 316). In some implementations, the minimum vertices and the maximum vertices of the origins are downsampled to reduce the number of points in the combined outline while preserving the overall shape as well as making the points in the combined outline (e.g., the point cloud 314, 316) more uniformly spaced. As an illustrative, non-limiting example, the minimum vertices and the maximum vertices are downsampled using Poisson disk sampling.

The processor 112 may repeat this process (402-412) for the other envelopes as well, such as the first motion envelope 142, the second motion envelope 144, or both.

Figure 5A:
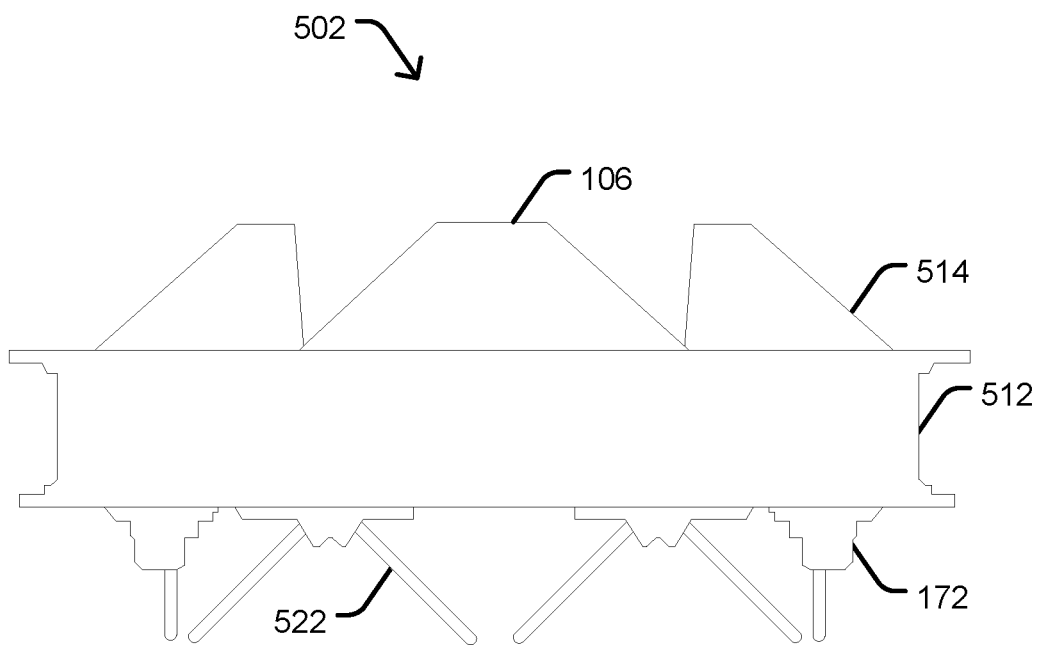
FIG. 5A is a diagram that illustrates a side view of an example of the object of FIG. 1.
Figure 5B:
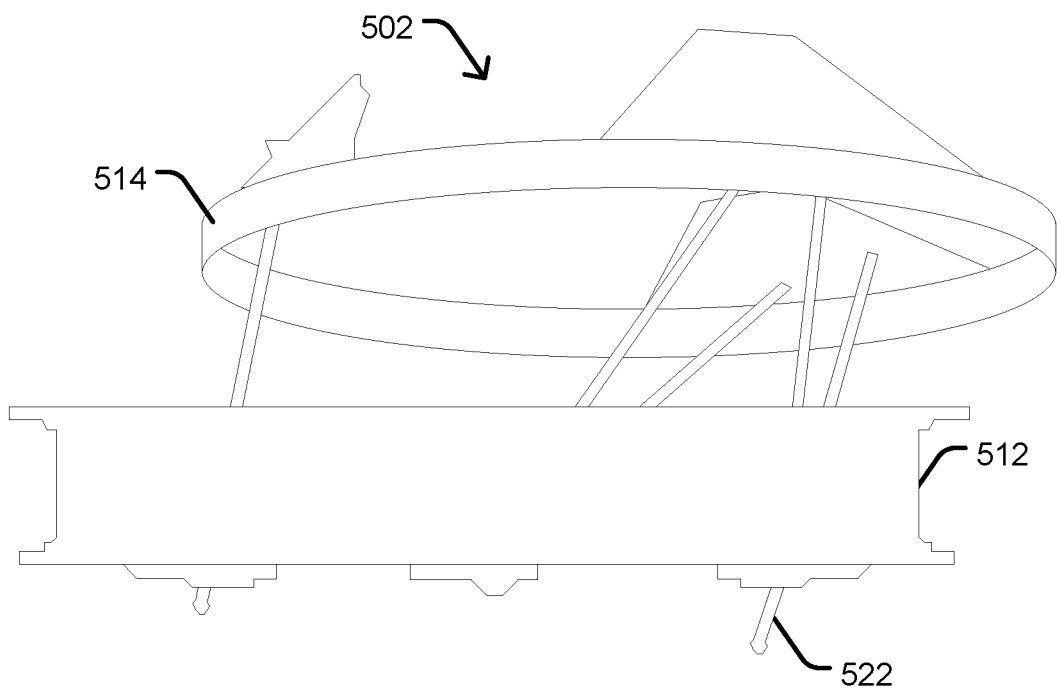
FIG. 5B is a diagram that illustrates another side view of the example of the object of FIG. 5A.
Figure 6:
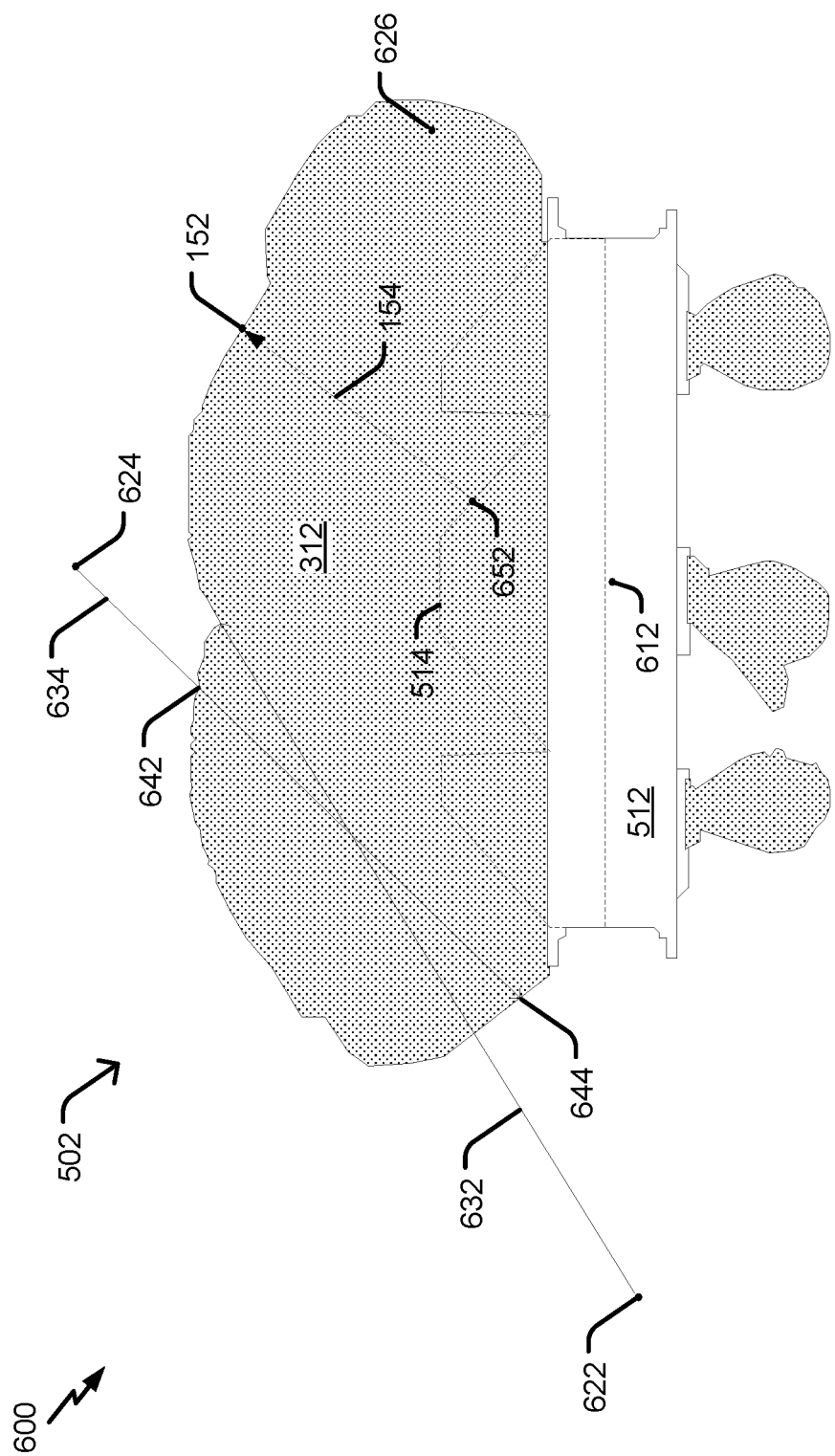
FIG. 6 is a diagram that illustrates a side view of a point cloud of FIG. 1.

FIGS. 5A and 5B are each a diagram illustrating a side view of an example of the object 106 of FIG. 1. In FIGS. 5A and 5B, the object 106 is a docking system 502 including a base 512 and a docking ring 514.

Referring to FIG. 5A, a side view of the docking system 502 in a stowed position is illustrated. In the stowed position, the docking ring 514 is positioned within the base 512. The docking system 502 further includes the actuators 172 coupled to the base 512 and the docking ring 514. In the docking system 502 illustrated in FIGS. 5A and 5B, the actuators 172 are linear actuators. The actuators 172 each include a corresponding actuator rod 522, such as a ball screw. In FIG. 5A, the actuator rods 522 are in a retracted position and extend below the base 512. Each actuator 172 forms a lower joint with the base 512 and an upper joint with the docking ring 514. Each actuator 172 can move (e.g., rotate) independently at each joint. For example, the actuators 172 can rotate in two directions (e.g., within two planes) and can be described in terms of two joint angles (e.g., gamma and delta).

Referring to FIG. 5B, an extended position of the docking system 502 is illustrated where the docking ring 514 is positioned outside of (e.g., above and to the right) the base 512. In FIG. 5B, the actuator rods 522 of the actuators 172 are in an extended position and have moved the docking ring 514 upwards and rightwards relative to the base 512.

FIG. 6 illustrates a diagram 600 of a side view of an example of motion cloud 312 of the docking system 502 (i.e., the object 106). The motion cloud 312 is a visual representation of the operational envelope 146 of the object 106, which in the example illustrated in FIG. 6 is the docking system 502. Although a two-dimensional representation of the motion cloud 312 is illustrated in FIG. 6, the motion cloud 312 is a three-dimensional representation of the operational envelope 146. A center point 612 (e.g., a default position or a stowed position) is illustrated in FIG. 6. The center point 612 is in the center of the base 512 of the docking system 502.

In FIG. 6, exemplary origins 622, 624, 626 are illustrated. A first origin 622 and a second origin 624 are illustrated as outside of the operational envelope 146 and the motion cloud 312. A third origin 626 is illustrated within the operational envelope 146 and the motion cloud 312. Although three origins 622-626 are illustrated in FIG. 6, additional origins or fewer origins may be used.

FIG. 6 also depicts rays 632, 634 emanating from the first origin 622 and the second origin 624, respectively. Although the rays 632, 634 would extend indefinitely or to boundaries of the virtual space of the kinematic simulator 132, as illustrated in FIG. 6, the rays 632, 634 terminate at the boundary of the motion cloud 312 for clarity. In FIG. 6, a first ray 632 emanates from the first origin 622 in a first direction and extends to the boundary of the motion cloud 312, and a second ray 634 emanates from the second origin 624 in a second direction and extends to the boundary of the motion cloud 312. In FIG. 6, points 642, 644 illustrate intersections of the second ray 634 and the boundary of the motion cloud 312. A first point 642 corresponds to a minimum vertex of the second ray 634, and a second point 644 corresponds to a maximum vertex of the second ray 634. To illustrate, the second point 644 is farther from the second origin 624 than the first point 642. Although two rays 632, 634 are illustrated in FIG. 6, additional rays would be used to generate the outlines in FIG. 3. For the third origin 626, and other origins within the operational envelope 146, line segments or ray pairs (i.e., a ray and a corresponding opposite ray) could be used instead of rays. For ray pairs, each ray of the ray pair would have a single point that intersects the boundary of the motion envelope, a maximum vertex, instead of two points that intersect the boundary. Thus, the maximum vertices of a ray pair correspond to the maximum and minimum vertices of a ray.

An exemplary point of interest 152 and corresponding movement path 154 are also illustrated in FIG. 6 with respect to the motion cloud 312. In FIG. 6, the point of interest 152 corresponds to a point within the motion cloud 312 that is at or near the boundary of the motion cloud 312. The movement path 154 includes a set of positions along a path from a particular exterior point 652 of the docking ring 514. The particular exterior point 652 corresponds to a part or point of a top exterior surface of the docking ring 514, and the movement path 154 illustrates the path of the particular exterior point 652 as the docking ring 514 moves from the default position or the stowed position to a maximum operation position where the particular exterior point 652 is at or near the boundary of the motion cloud 312. Although the movement path 154 is illustrated as a straight line in FIG. 6, in other implementations the movement path 154 may not be a straight line due to internal collisions, parameters of the actuators 172, or parameters of a control system thereof.

Figure 7:
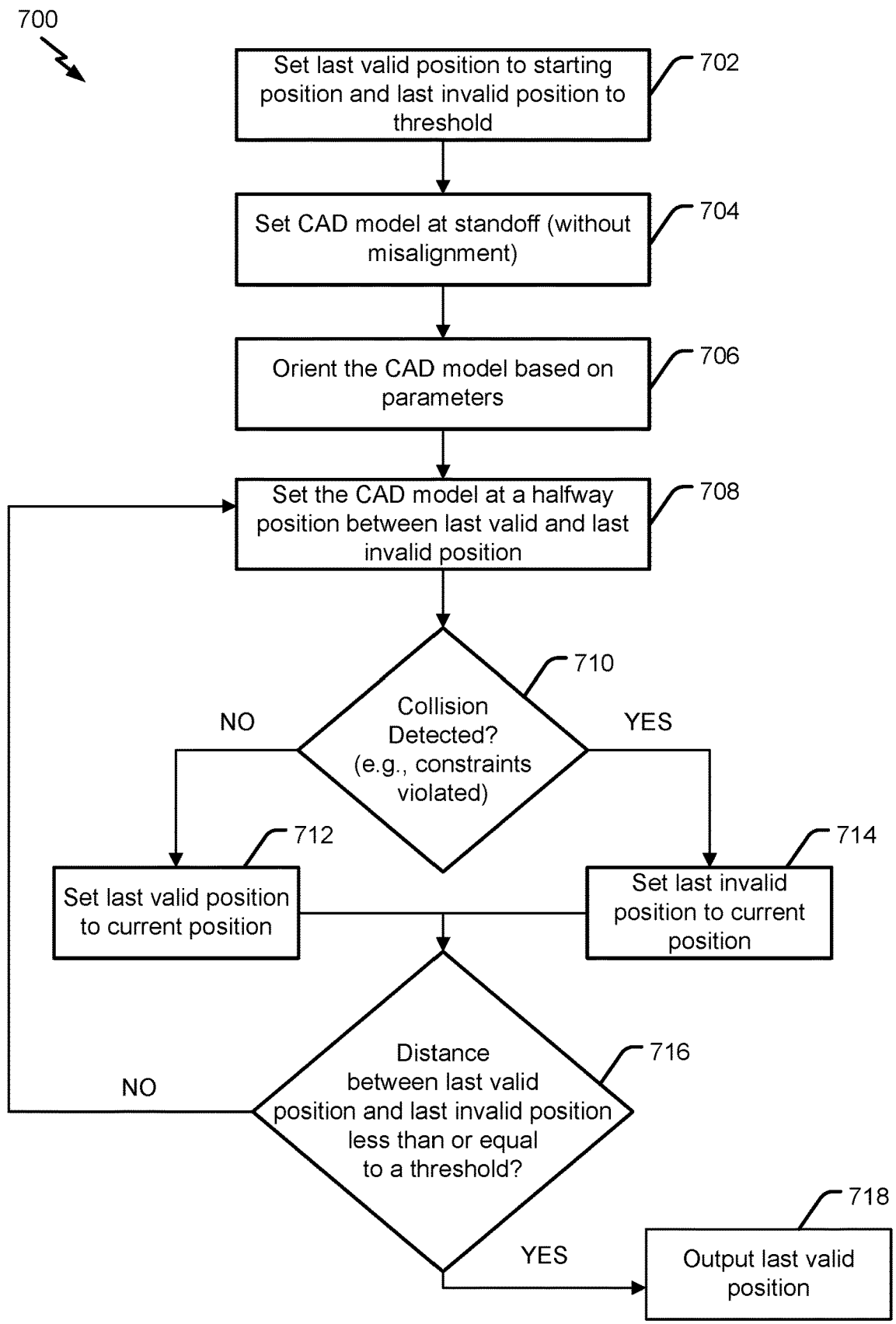
FIG. 7 is a flow chart of an example of a determining a first motion envelope or an operational envelope.

FIG. 7 is a flow chart 700 of an example of a method of determining a first motion envelope or an operational envelope, such as the first motion envelope 142 or the operational envelope 146. The method represented by the flow chart 700 may be performed by the system 100 of FIG. 1, such as the processor 112. In FIG. 7, the difference between determining a first motion envelope 142 or an operational envelope 146 is in which constraints and parameters are used. For example, in determining the first motion envelope 142, kinematic constraints are used, and in determining the operational envelope 146, the kinematic constraints and dynamic constraints (e.g., the VRDM limits of the VRDM table which are represented by the second motion envelope 144) are used. When determining the operational envelope 146, the first motion envelope 142 can be used in place of the kinematic constraints.

The flow chart 700 includes setting, at 702, a last valid position of a CAD model of the object 106 to an original position (e.g., the center point 612) and a last invalid position to a known invalid position of the CAD model of the object 106. The positions may be determined with respect to a particular component of the object 106 using the CAD models 140. For example, the positions correspond to positions of the docking ring 514 of the docking system 502, such as a center point of the docking ring 514. The known invalid position may correspond to a position of the object 106 that exceeds the capabilities of the actuators 172 for all parameters. To illustrate, the known position corresponds to a position of the docking ring 514 (e.g., a position of the center of the docking ring 514) that is further from the center point 612 than the actuators 172 can extend the actuator rods 522.

The flow chart 700 includes setting, at 704, the CAD model of the object 106 (e.g., a component thereof) at a standoff distance from the original position. The standoff distance is a non-zero value, and the standoff distance from the original position results in a position where all radial misalignments of the object 106 are zero. In some implementations, the standoff distance from the original position corresponds to a standoff position of the docking ring 514 that is a non-zero distance from the stowed position along a cylindrical axis of the object 106. For example, the processor 112 manipulates the CAD models 140 of the object 106 to position the docking ring 514 at a standoff distance from the center point 612 without any radial misalignment of the docking ring 514.

The flow chart 700 includes orienting, at 706, the CAD model of the object 106 based on one or more parameters. The one or more parameters correspond to the degrees of freedom of the object 106, i.e., corresponds to the movement possibilities of the object 106. For the docking system 502, the one or more parameters include wobble angle, wobble direction, roll angle, standoff distance, radial misalignment, radial misalignment direction, or a combination thereof. To illustrate, the processor 112 manipulates the CAD models 140 of the object 106 to orient the docking ring 514 at its current position based on the one or more parameters. For example, the processor 112 manipulates the docking ring 514 to tilt the docking ring 514 to increase the wobble angle without changing the position of the center of the docking ring 514 with respect to the center point 612.

The flow chart 700 includes setting, at 708, a current position of the CAD model of the object 106 as a halfway position between the last valid position and the last invalid position. For example, the processor 112 manipulates the CAD models 140 of the object 106 to move the docking ring 514 to set the position the docking ring 514 such that the center of the docking ring 514 is halfway between the standoff distance (or standoff point) and the known invalid point.

The flow chart 700 includes determining, at 710, whether the CAD model of the object 106 experiences a collision based on the current position and one or more constraints of the first motion envelope, the second motion envelope, or both. The collision includes internal collisions between components of the object and external collisions between the object and another object. The one or more constraints include kinematic constraints (e.g., mechanism hardware limits) and operational constraints (e.g., analytically derived from motion design requirements of the object 106). As illustrative, non-limiting examples, mechanism hardware limits for the docking system 502 include actuators 172 limits, such as stroke length and joint angle. As illustrative, non-limiting examples, operational constraints for the docking system 502 include operational wobble angle and roll angle limits.

In some implementations, the processor 112 utilizes kinematic constraints to generate the first motion envelope 142 and uses kinematic constraints and dynamic constraints to generate the operational envelope 146. To illustrate, the processor 112, using the kinematic simulator 132, determines attribute values corresponding to the kinematic constraints, the operational constraints, or both, for the current position and compares the attribute values to the kinematic constraints, the operational constraints, or both, to determine if the attribute values violates (e.g., is greater than, is less than, etc.) either of the kinematic constraints or the operational constraints.

Additionally or alternatively, the processor 112 determines, using the kinematic simulator 132, if distances between two surfaces of the CAD models 140 of the object 106 are less than a collision threshold distance and/or if distance between a surface of the CAD models 140 of the object 106 and another surface of another object of the CAD models 140 are less than a collision threshold distance. The collision threshold distance may represent a clearance tolerance and/or a buffer when simplified CAD models 140 are used to generate the virtual model 150. The collision threshold distance may have a value of zero or greater. In some implementation, the processor 112 employs a separating axis test to check for collisions. For example, polygonal shapes (e.g., triangles) of the surfaces of the virtual model 150 are checked for collision with each other. The separating axis test determines whether or not it is possible to generate a plane in 3D space between two polygonal shapes without intersecting either polygonal shape. If it is possible to generate a plane that does not intersect either polygonal shape (i.e., the plane separates the polygonal shapes), then the polygonal shapes do not intersect (i.e., collide).

In some implementations, prior the performing the coarse collision detection (using constraints) or the fine collision detection (using surfaces), a virtual space that the virtual model 150 occupies is converted into a grid of rectangular prisms or cubes referred to as colliders. A size of the colliders may be determined based on size of the parts of the object 106 and a density of triangles of the surfaces of the virtual model 150. The processor 112 determines which triangles of the surfaces are in each collider. Colliders that do not have any triangles may be omitted from the collision detection process.

Additionally, parts (e.g., the actuators 172 and the components 174) of the object 106 can be classified into categories to simplify collision detection. For example, the parts can be classified as static parts (i.e., parts that do not move relative to a particular part, such as the base 512) and dynamic parts (i.e., parts that do move relative to the particular part, such as the docking ring 514). The dynamic parts may be further classified into self-colliding parts and non-self-colliding parts (e.g., the actuators 172 and the actuator rods 522). The system 100 can refrain from checking collisions between non-self-colliding parts or the system can refrain from flagging collisions resulting from non-self-colliding parts. Non-self-colliding parts include parts that are coupled together or intended to touch each other, such as an actuator 172 and corresponding actuator rod 522. Additionally, the actuator rods 522 and the base 512 would be determined as "colliding" constantly, and thus the actuator rods 522 and the base 512 can be categorized as non-self-colliding such that those collisions are not considered as limiting collisions.

Responsive to determining that the object 106 does not experience a collision, the flow chart 700 includes setting, at 712, the current position as the last valid position. For example, the processor 112 adjusts the value of the last valid position to the current position. Alternatively, responsive to determining that the object experiences a collision, the flow chart 700 includes setting, at 714, the current position as the last invalid position. For example, the processor 112 adjusts the value of the last invalid position to the current position.

The flow chart 700 includes determining, at 716, whether a distance between the last valid position and the last invalid position is less than or equal to a threshold distance. For example, the processor 112 determines whether the last valid position of the docking ring 514 and the last invalid position of the docking ring 514 is less than or equal to a threshold distance. The threshold distance includes or corresponds to an accuracy or tolerance of the first motion envelope 142 or the operational envelope 146.

The flow chart 700 includes, responsive to determining that the distance between the last valid position and the last invalid position is less than or equal to a threshold distance, outputting, at 718, the last valid position to the operational envelope. For example, the processor 112 adds the last valid position to the first motion envelope 142 or the operational envelope 146.

Alternatively, responsive to determining that the distance between the last valid position and the last invalid position is greater than or equal to the threshold distance, the process goes back to step 708. This process corresponds to a type of binary search algorithm where if the threshold distance is not satisfied, the process includes a loop (steps 708-716) which rechecks for a collision using an updated last valid position or an updated last invalid position until the distance between the last valid position and the last invalid position is less than or equal to the threshold distance. Thus, the threshold distance further includes or corresponds to an accuracy or tolerance of the binary search algorithm.

Figure 8:
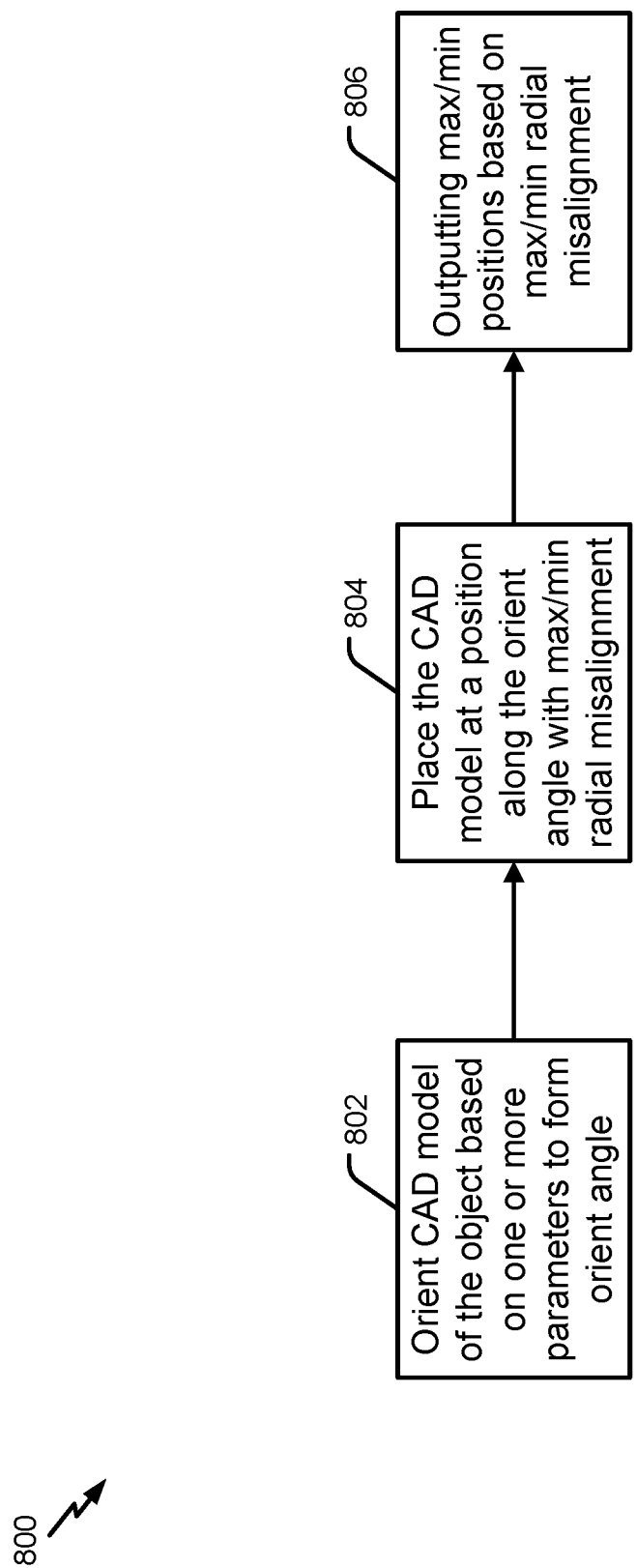
FIG. 8 is a flow chart of an example of a determining a second motion envelope.

FIG. 8 is a flow chart 800 of an example of a method of determining a second motion envelope 144 of an object, such as the object 106 of FIG. 1. The method represented by the flow chart 800 may be performed by the system 100 of FIG. 1, such as the processor 112. In FIG. 8, flow chart 800 is described with reference to the object 106 of FIGS. 5A and 5B, i.e., the docking system 502.

The flow chart 800 includes orienting 802 a CAD model of the object 106 based on one or more parameters. For example, the object 106 (or a component 174 thereof) is oriented virtually at various parameter values for the one or more parameters. To illustrate, the processor 112, using the kinematic simulator 132, orients the CAD models 140 of the docking ring 514 of the docking system 502 at various combinations of wobble angles, in multiple wobble directions, and roll angles to orient the CAD models 140 of the docking ring 514 at an orient angle. The processor 112 may determine maximum and minimum wobble angles and roll angles based on the VRDM limits table. For example, potential orient angles (and positions along the orient angles) are generated by parameterizing wobble angles and roll angles based on the VRDM table limits. However, the positions along the orient angles may or may not result in collisions or be physically possible. As explained above, that is why the operational envelope 146 is generated based on the intersection of the first motion envelope 142 and the second motion envelope 144.

The flow chart 800 includes placing 804 a CAD model of the object 106 at a position along the orient angle. For example, the object 106 (or a component 174 thereof) is virtually placed or positioned at one or more radial misalignment values along each orient angle produced by the combination of the one or more parameters. To illustrate, the processor 112, using the kinematic simulator 132, positions the CAD models 140 of the docking ring 514 of the docking system 502 at positions (e.g., maximum and minimum positions) corresponding to a maximum radial misalignment and/or standoff value and a minimum radial misalignment and/or standoff value along the orient angle, defined by the various combinations of wobble angles and roll angles. The processor 112 may determine maximum and minimum radial misalignment values and/or standoff values based on the VRDM limits table.

The flow chart 800 includes outputting 806 the maximum and minimum positions based on the maximum and minimum radial misalignment values. For example, the processor 112 generates the second motion envelope 144 based on adding the maximum and minimum positions of the object 106, determined by placing the CAD models 140 of the object 106 along each orient angle according to the maximum and minimum radial misalignment values and/or standoff values, to a file corresponding to the second motion envelope 144.

FIG. 9 is a diagram 900 that illustrates points of interest and actuator envelopes of the actuators 172 of the docking system 502 of FIG. 5. As explained with reference to FIG. 5, the actuators 172 are linear actuators and each includes a lower joint angle and an upper joint angle. In FIG. 9, diagrams of the operational envelope of the lower joint angles of the actuators 172, i.e., joint envelopes 954, are depicted. Each diagram illustrates the joint envelopes 954 of the actuators 172 with respect to lower joint angles in terms of gamma and delta. Additionally, each diagram illustrates areas of interest 952 (e.g., multiple points of interest 152). The areas of interest 952 are positioned close to boundaries of the joint envelopes 954. The areas of interest 952 shown in FIG. 9 overlap with each other, i.e., the areas of interest 952 of the first actuator 172 overlap (at least partially) with one or more of the areas of interest 952 of the second through sixth actuators 172. In other implementations, more areas of interest 952 can be selected. Additionally or alternatively, other areas of interest 952 can be selected, such as non-overlapping areas of interest 952 or areas of interest 952 further from the boundaries of the joint envelopes 954.

In some implementations, test points are chosen within the areas of interest 952. For each area of interest 952, there may be thousands of positions of the object 106 that satisfy the area of interest 952, i.e., many positions of the object 106 where the joint angles of a particular actuator 172 satisfies the joint angles (i.e., joint angle conditions) of a particular area of interest 952. To illustrate, test points near a particular area (e.g., an area of importance or critical area) can be chosen. For example, areas near boundaries or maximum extension can be chosen. As an illustrative non-limiting example, when the object 106 is the docking system 502, positions of the docking ring 514 that satisfy the areas of interest 952 (e.g., satisfy conditions thereof) may be filtered by using an operating position (e.g., a ready to capture position where the docking ring 514 is extended from the base 512) of the docking ring 514 and a threshold. To illustrate, all positions of the docking ring 514 that are achievable when the first actuator 172 has a lower alpha angle between [X1,X2] and lower gamma angle between [Y1,Y2] and that are within a threshold distance from the ready to capture position of the docking ring 514 are selected as test points. Additional test points outside of the areas of interest 952 can be tested as well.

Figure 10:
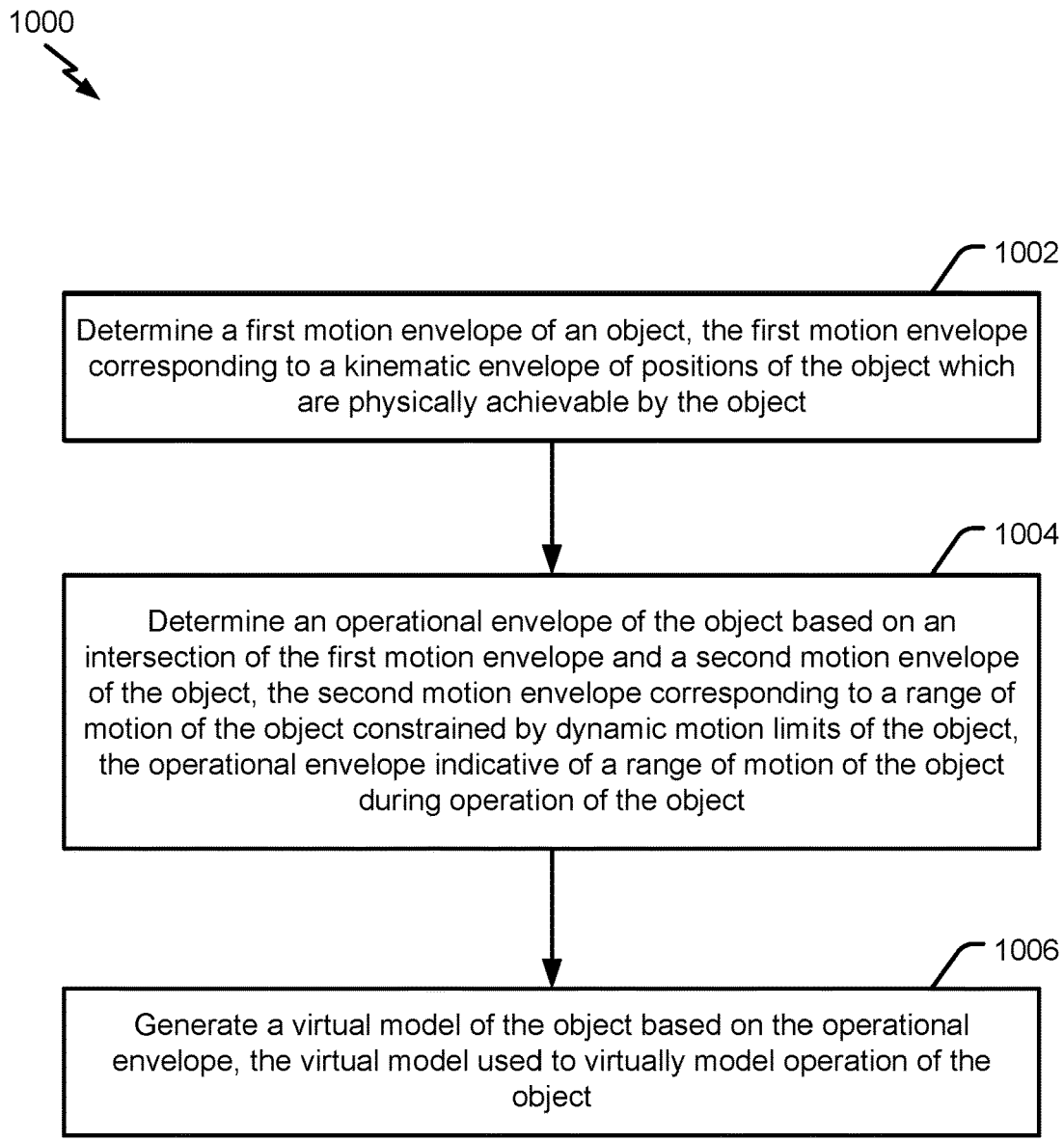
FIG. 10 is a flow chart of an example of a method of generating a virtual model.

FIG. 10 illustrates a particular example of a method 1000 of generating a virtual model, such as the virtual model 150 of FIG. 1. The method 1000 may be performed by the system 100, the computer 102, the processor 112, or a combination thereof. The method 1000 includes, at 1002, determining a first motion envelope of an object. The first motion envelope corresponds to a kinematic envelope of positions of the object which are achievable by the object. For example, the first motion envelope may include or correspond to the first motion envelope 142 of FIG. 1. The object may include or correspond to the object 106 of FIG. 1 and have multiple degrees of freedom. In a particular implementation, the object 106 has three or more degrees of freedom. To illustrate, the processor 112 of the computer 102 determines the first motion envelope 142 of the object 106, as described with reference to FIGS. 1 and 7. As an illustrative example, the processor 112 manipulates the CAD models 140 to position the CAD models 140 based on one or more parameters of the object 106 and the processor 112 checks that the position of the CAD models 140 does not violate the kinematic constraints of the object 106.

The method 1000 also includes, at 1004, determining an operational envelope of the object based on an intersection of the first motion envelope and a second motion envelope of the object. The second motion envelope corresponds to a range of motion of the object constrained by dynamic motion limits of the object, and the operational envelope is indicative of a range of motion of the object during operation of the object. For example, the second motion envelope may include or correspond to the second motion envelope 144 of FIG. 1, and the operational envelope may include or correspond to the operational envelope 146 of FIG. 1. To illustrate, the processor 112 of the computer 102 determines the operational envelope 146 of the object 106 based on an intersection of the first motion envelope 142 and the second motion envelope 144, as described with reference to FIGS. 1 and 8. As an illustrative example, the processor 112 manipulates the CAD models 140 to orient the CAD models 140 based on parameterizing one or more parameters of the object 106 and places the position of the CAD models 140 based on maximum and minimum dynamic constraints (e.g., radial misalignment) of the object 106.

The method 1000 further includes, at 1006, generating a virtual model of the object based on the operational envelope, the virtual model used to virtually model operation of the object. For example, the virtual model may include or correspond to the virtual model 150 of FIG. 1. To illustrate, the processor 112 of the computer 102 generates the virtual model 150 of the object 106 based on the operational envelope 146, as described with reference to FIGS. 1, 3, and 4. As an illustrative example, the processor 112 manipulates the CAD models 140 to position the CAD models 140 based on one or more parameters of the object 106 and checks (e.g., verifies) that the position of the CAD models 140 does not violate the first motion envelope 142 and the second motion envelope 144.

In some implementations, the first motion envelope 142 includes potential docking ring 514 positions defined by parameterizing wobble, roll, wobble direction, standoff, radial misalignment, radial misalignment direction, or a combination thereof, that satisfy kinematic constraints. For each potential position of the docking ring 514, the parameters used to define each potential position and the corresponding actuator stroke lengths and joint angles are determined.

In some implementations, the second motion envelope 144 includes potential docking ring 514 positions defined by parameterizing wobble angle and roll angle based on the VRDM table limits. These positions may not take into consideration collisions or the physical possibility of the positions.

In some implementations, the operational envelope 146 includes valid docking ring 514 positions defined by parameterizing wobble, roll, wobble direction, standoff, radial misalignment, radial misalignment direction, or a combination thereof, that satisfy kinematic constraints and operational constraints. For each valid position of the docking ring 514, the parameters used to define each valid position and the corresponding actuator stroke lengths and joint angles are determined.

In some implementations, the method 1000 further includes one or more operations described with reference to FIG. 1, in the flow chart 200 of FIG. 2, the flow chart 300 of FIG. 3, the flow chart 400 of FIG. 4, the flow chart 700 of FIG. 7, the flow chart 800 of FIG. 8, or a combination thereof. As an illustrative, non-limiting example, the method 1000 further includes manipulating the virtual model 150 along the movement paths 154 and checking for collisions at each point along the movement path, such as by coarse collision detection, fine collision detection or both.

The method 1000 of FIG. 10 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 1000 of FIG. 10 can be initiated or controlled by one or more processors, such as one or more processors included in a control system. In some implementations, a portion of the method 1000 of FIG. 10 may be combined with a second portion of the method 1000 of FIG. 10 and/or combined with one or more operations described in the flow chart 200 of FIG. 2, the flow chart 300 of FIG. 3, the flow chart 400 of FIG. 4, the flow chart 700 of FIG. 7, the flow chart 800 of FIG. 8, or a combination thereof. Additionally, one or more operations described with reference to the method 1000 of FIG. 10 may be optional and/or may be performed in a different order than shown or described. Two or more operations described with reference to the method 1000 of FIG. 10 may be performed at least partially concurrently.

Figure 11:
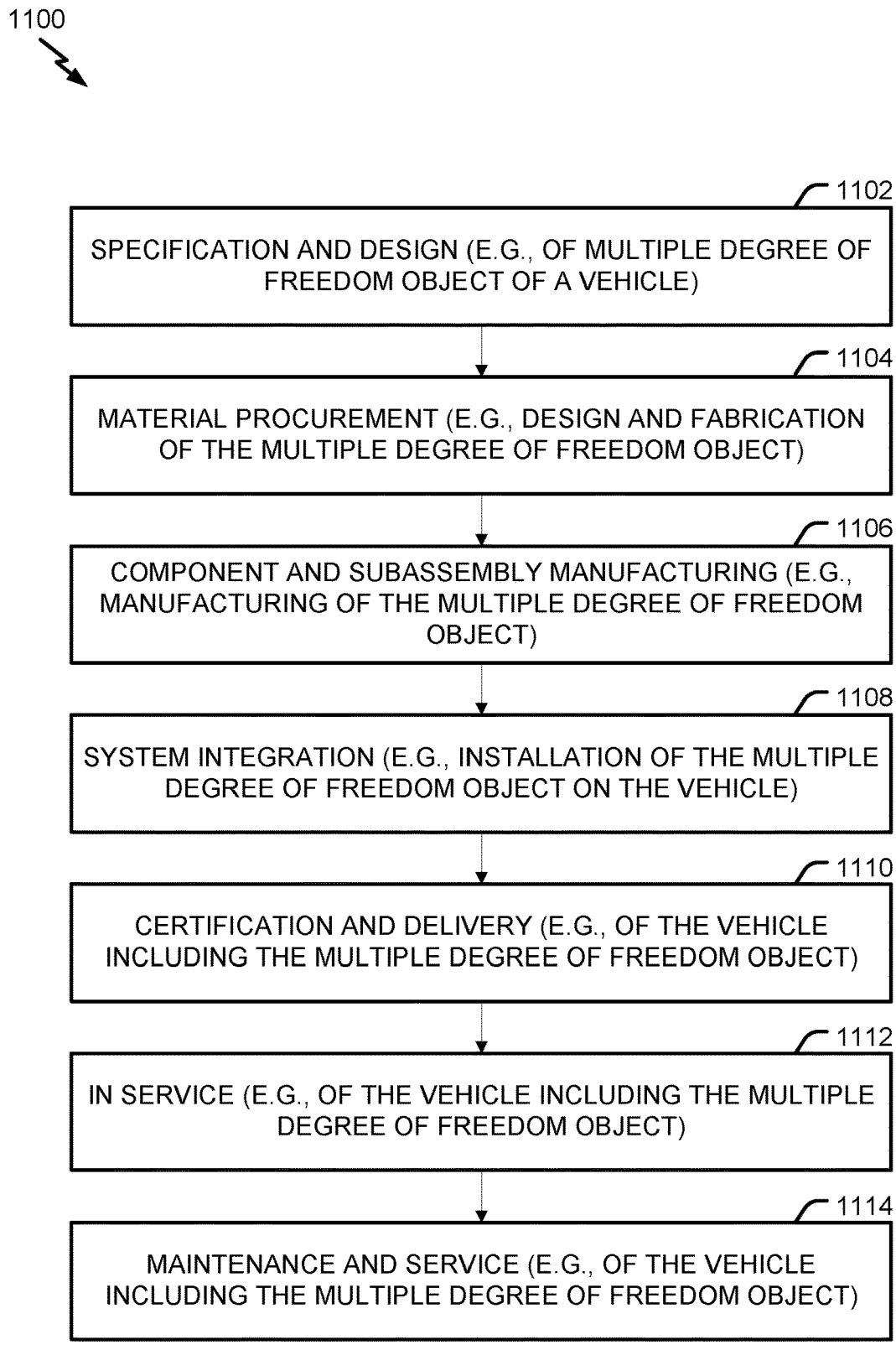
FIG. 11 is a flow chart of an example of a method of manufacturing a vehicle including an object that was virtually tested.
Figure 12:
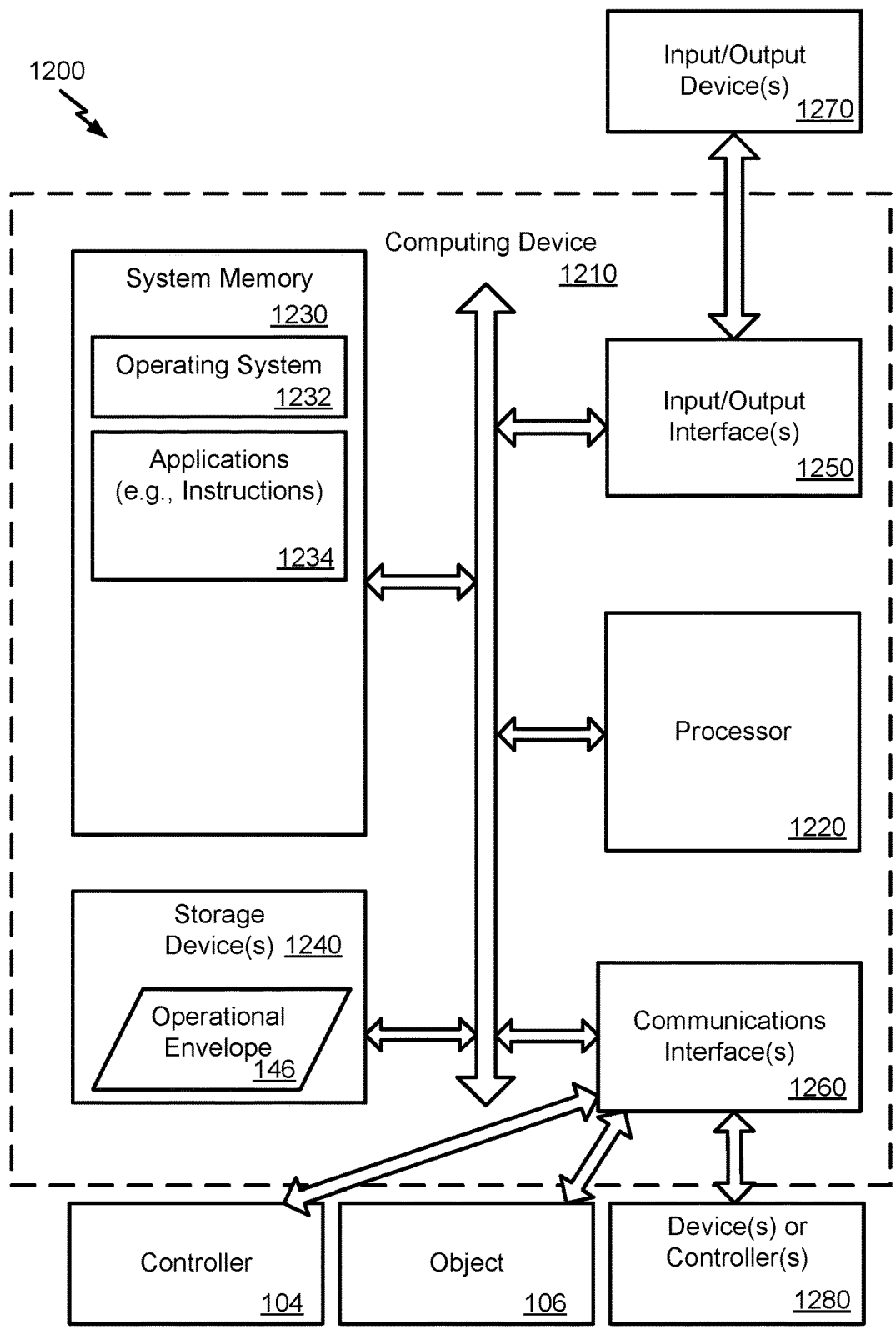
FIG. 12 is a block diagram of a particular example of a computing environment configured to support generating a virtual model according to the present disclosure.

Referring to FIGS. 11 and 12, examples of the disclosure are described in the context of a vehicle manufacturing and service method 1100 as illustrated by the flow chart of FIG. 11 and a computing environment 1200 as illustrated by the block diagram of FIG. 12. A vehicle produced by the vehicle manufacturing and service method 1100 of FIG. 11, such as a vehicle including the docking system 502, may include an aircraft, an airship, a rocket, a satellite, a submarine, or another vehicle, as illustrative, non-limiting examples. The vehicle may be manned or unmanned (e.g., a drone or an unmanned aerial vehicle (UAV)).

Referring to FIG. 11, a flowchart of an illustrative example of a method of manufacture and service for a vehicle including an object that was virtually tested is shown and designated 1100. During pre-production, the exemplary method 1100 includes, at 1102, specification and design of a vehicle, such as a vehicle including the docking system 502. During the specification and design of the vehicle, the method 1100 may include specifying a design of a multiple degree of freedom object, such as the object 106 of FIG. 1. Additionally, the specification and design of the multiple degree of freedom object of the vehicle may include performing one or more steps of the method 1000 of FIG. 10 and/or one or more operations described in the flow chart 200 of FIG. 2, the flow chart 300 of FIG. 3, the flow chart 400 of FIG. 4, the flow chart 700 of FIG. 7, the flow chart 800 of FIG. 8, or a combination thereof. At 1104, the method 1100 includes material procurement. For example, the method 1100 may include procuring materials for the object 106 of the vehicle.

During production, the method 1100 includes, at 1106, component and subassembly manufacturing and, at 1108, system integration of the vehicle. The method 1100 may include component and subassembly manufacturing (e.g., manufacturing the object 106 of FIG. 1) of the vehicle and system integration (e.g., coupling the object 106 of FIG. 1 to one or more components of the vehicle). At 1110, the method 1100 includes certification and delivery of the vehicle and, at 1112, placing the vehicle in service. Certification and delivery may include certifying the object 106 of FIG. 1 by analysis, inspection, or non-destructive testing. For example, certifying the object 106 may include performing one or more steps of the method 1000 of FIG. 10 and/or one or more operations described in the flow chart 200 of FIG. 2, the flow chart 300 of FIG. 3, the flow chart 400 of FIG. 4, the flow chart 700 of FIG. 7, the flow chart 800 of FIG. 8, or a combination thereof. While in service by a customer, the vehicle may be scheduled for routine maintenance and service (which may also include modification, reconfiguration, refurbishment, and so on). At 1114, the method 1100 includes performing maintenance and service on the vehicle. The method 1100 may include performing maintenance and service of the object 106 of FIG. 1. For example, maintenance and service of the object 106 may include replacing one or more of the actuators 172 and/or the components 174 of the object 106. Additionally or alternatively, when an actuator 172 or a component 174 is replaced with a new type of actuator 172 or component 174 and/or when a new component 174 is added, one or more steps of the method 1000 of FIG. 10 and/or one or more operations described in the flow chart 200 of FIG. 2, the flow chart 300 of FIG. 3, the flow chart 400 of FIG. 4, the flow chart 700 of FIG. 7, the flow chart 800 of FIG. 8, or a combination thereof, may be performed to verify or update the operational envelope 146 of the object 106.

Each of the processes of the method 1100 may be performed or carried out by a system integrator, a third party, and/or an operator (e.g., a customer). For the purposes of this description, a system integrator may include without limitation any number of vehicle manufacturers and major-system subcontractors; a third party may include without limitation any number of vendors, subcontractors, and suppliers; and an operator may be an airline, leasing company, military entity, service organization, and so on.

FIG. 12 is an illustration of a block diagram of a computing environment 1200 including a general purpose computing device 1210 configured to support embodiments of computer-implemented methods and computer-executable program instructions (or code) according to the present disclosure. For example, the computing device 1210, or portions thereof, may execute instructions to perform the functions of the system 100 or functions of a portion of the system 100, such as the computer 102 or the controller 104. The instructions to control the system 100 (or of a portion of the system 100, such as the computer 102 or the controller 104) may include instructions to perform operations of determining a first motion envelope of an object. The first motion envelope corresponds to a kinematic envelope of positions of the object which are achievable by the object. The instructions to control the system 100 (or the portion of the system 100) may also include instructions to perform operations of determining an operational envelope of the object based on an intersection of the first motion envelope and a second motion envelope of the object. The second motion envelope corresponds to a range of motion of the object constrained by dynamic motion limits of the object, and the operational envelope is indicative of a range of motion of the object during operation of the object. The instructions to control the system 100 (or the portion of the system 100) may further include instructions to perform operations of generating a virtual model of the object based on the operational envelope. The virtual model is used to virtually model operation of the object.

In some implementations, the computing device 1210, or portions thereof, may further execute instructions to perform operations of receiving a VRDM limits table indicative of dynamic motion limits specified by design specifications and generating the VRDM envelope based on the VRDM limits table, as described with reference to FIG. 2. Additionally or alternatively, the computing device 1210, or portions thereof, may further execute instructions to perform operations according to any of the flow charts and/or methods described herein, such as the flow chart 200 of FIG. 2, the method 1000 of FIG. 10, or a combination thereof.

The computing device 1210 may include a processor 1220. The processor 1220 may communicate with system memory 1230, one or more storage devices 1240, one or more input/output interfaces 1250, one or more communications interfaces 1260, or a combination thereof. In a particular embodiment, the processor 1220 includes or corresponds to the processor 112 of computer 102 or the processor 112A of the controller 104. The system memory 1230 may include volatile memory devices (e.g., random access memory (RAM) devices), nonvolatile memory devices (e.g., read-only memory (ROM) devices, programmable read-only memory, and flash memory), or both. The system memory 1230 may include an operating system 1232, which may include a basic/input output system for booting the computing device 1210 as well as a full operating system to enable the computing device 1210 to interact with users, other programs, and other devices. The system memory 1230 may include one or more applications 1234 which may be executable by the processor 1220. For example, the one or more applications 1234 may include instructions executable by the processor 1220 to control the system 100 to generate the virtual model 150, manipulate the virtual model 150 through movement paths 154, output commands 162, output signals 164, or a combination thereof.

The processor 1220 may also communicate with one or more storage devices 1240, such as the memory 114 of FIGS. 1 and 2. For example, the one or more storage devices 1240 may include nonvolatile storage devices, such as magnetic disks, optical disks, or flash memory devices. The storage devices 1240 may include both removable and non-removable memory devices. The storage devices 1240 may be configured to store an operating system, images of operating systems, applications, and program data. The storage devices 1240 may also store the operational envelope 146. In a particular embodiment, the system memory 1230, the storage devices 1240, or both, include tangible computer-readable media.

The processor 1220 may communicate with one or more input/output interfaces 1250 that enable the computing device 1210 to communicate with one or more input/output devices 1270 (such as the display 116 of FIG. 1) to facilitate user interaction. The input/output interfaces 1250 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 1270 may include keyboards, pointing devices, displays, speakers, microphones, touch screens, and other devices. The processor 1220 may detect interaction events based on user input received via the input/output interfaces 1250. Additionally, the processor 1220 may send a GUI to a display device (e.g., the display 116) via the input/output interfaces 1250.

The processor 1220 may communicate with the controller 104, the object 106, one or more devices 1280, or a combination thereof, via the one or more communications interfaces 1260. The one or more communications interfaces 1260 may include wired Ethernet interfaces, IEEE 802 wireless interfaces, other wireless communication interfaces, or other network interfaces. The one or more devices 1280 may include host computers, servers, workstations, and other computing devices.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system comprising:
a processor;
a memory coupled to the processor, the memory storing instructions that, when executed by the processor, cause the processor to:
determine a first motion envelope comprising a first plurality of points describing an object, wherein the object comprises portions including actuators and one or more components coupled to the actuators, and wherein the first plurality of points identifies a kinematic envelope of positions of particular portions of the portions which are achievable by activation of the actuators, wherein the first motion envelope is determined based on a Computer Aided Design (CAD) model of the object, wherein the CAD model omits one or more components of the object that will not cause collisions, omits one or more flexible components of the object, replaces a curved surface of the object with a straight surface removes an indention of a surface of the object, or a combination thereof;
determine a second motion envelope comprising a second plurality of points describing a range of motion of the particular portions constrained by dynamic motion limits of the object;
perform an intersect operation between the first motion envelope and the second motion envelope of the object to identify a third plurality of points identified by both the first motion envelope and the second motion envelope, the third plurality of points comprising fewer points than the first plurality of points, fewer points than the second plurality of points, or both;
determine an operational envelope of the object based on the third plurality of points, the operational envelope indicative of a range of motion of the object during operation of the object;
generate a virtual model of the object based on the operational envelope; and
model operation of the object with the virtual model to determine whether a collision between a first portion of the object and a second portion of the object occurs along a motion path during operation of one or more of the actuators; and
an interface, wherein the interface sends commands to a controller of the object to control movement of the object based on collision-free movement paths determined from use of the virtual model.

2. The system of claim 1, further comprising a display device configured to display the virtual model.

3. The system of claim 1 further comprising a kinematic simulator configured to virtually model movement of the object through the operational envelope based on the virtual model.

4. The system of claim 1, wherein the instructions further cause the processor to generate commands indicative of collision-free movement paths of the object through the operational envelope based on the virtual model, and further comprising the controller, wherein the controller is configured to receive the commands and to generate signals based on the commands, and wherein the object is configured to receive the signals from the controller and is configured to move along the collision-free movement paths based on the signals received from the controller.

5. The system of claim 1, wherein the interface is configured to transmit the commands via a network to the controller.

6. The system of claim 1, wherein the object has three or more degrees of freedom.

7. A method comprising:
  determining, by a processor, a first motion envelope comprising a first plurality of points describing an object, wherein the object comprises portions including actuators and one or more components coupled to the actuators, and wherein the first plurality of points identifies a kinematic envelope of positions of particular portions of the portions which are achievable by activation of the actuators, wherein the first motion envelope is determined based on a Computer Aided Design (CAD) model of the object, wherein the CAD model omits one or more components of the object that will not cause collisions, omits one or more flexible components of the object, replaces a curved surface of the object with a straight surface, removes an indention of a surface of the object, or a combination thereof;
  determining a second motion envelope comprising a second plurality of points describing a range of motion of the particular portions constrained by dynamic motion limits of the object;
  performing an intersect operation between the first motion envelope and the second motion envelope of the object to identify a third plurality of points identified by both the first motion envelope and the second motion envelope, the third plurality of points comprising fewer points than the first plurality of points, fewer points than the second plurality of points, or both;
  determining an operational envelope of the object based on the third plurality of points, the operational envelope indicative of a range of motion of the object during operation of the object;
  generating a virtual model of the object based on the operational envelope;
  modeling operation of the object using the virtual model to determine whether a collision between a first portion of the object and a second portion of the object occurs along a motion path during operation of one or more of the actuators; and
  sending commands to the object to control movement of the object based on movement paths determined from use of the virtual model.

8. The method of claim 7, wherein determining the first motion envelope comprises employing a binary search algorithm to determine the first motion envelope.

9. The method of claim 7, wherein determining the operational envelope comprises:
  setting a last valid position of a Computer-Aided Design (CAD) model of the object to an original position and a last invalid position of the CAD model of the object to a known invalid position;
  orienting the CAD model of the object based on one or more parameters;
  setting a current position of the CAD model of the object as a halfway position between the last valid position and the last invalid position;
  determining whether the CAD model of the object experiences a collision based on the current position and one or more constraints and operational constraints of the first motion envelope, the second motion envelope, or both, the collision including internal collisions between components of the object and external collisions between the object and another object;
  responsive to determining that the CAD model of the object experiences the collision, setting the current position as the last invalid position;
  determining whether a distance between the last valid position and the last invalid position is less than or equal to a threshold distance; and
  responsive to determining that the distance between the last valid position and the last invalid position is less than or equal to the threshold distance, adding the last valid position to the operational envelope.

10. The method of claim 7, wherein generating the virtual model of the object comprises:
  generating a motion cloud based on the operational envelope and computer-aided design models, the motion cloud comprising a visual representation of the operational envelope;
  determining outlines of one or more of the portions of the object based on the motion cloud;
  generating meshes of the one or more of the portions of the object based on the outlines;
  generating surfaces of virtual models of the one or more of the portions based on the meshes; and
  generating the virtual model of the object based on the virtual models.

11. The method of claim 10, wherein determining a first outline of the outlines for a first portion of the one or more of the portions comprises:
  defining multiple origins within the operational envelope, the multiple origins including a first origin and a second origin, wherein each origin of the multiple origins is associated with a plurality of rays emanating from the origin and extending to a boundary of the operational envelope;
  determining a minimum point and a maximum point that intersects the motion cloud for each ray of a first plurality of rays corresponding to the first origin;
  generate a first surface outline based on the minimum point and the maximum point that intersects the motion cloud for each ray of the first plurality of rays;
  determining, a minimum point and a maximum point that intersects the motion cloud for each ray of a second plurality of rays corresponding to the second origin;
  generating a second surface outline based on the minimum point and the maximum point that intersects the motion cloud for each ray of the second plurality of rays; and
  combining the first surface outline and the second surface outline to generate the first outline.

12. The method of claim 7, further comprising:
  identifying a point of interest within the operational envelope, the point of interest corresponding to a point near a boundary of the operational envelope;
  determining whether one or more movement paths to arrive at the point of interest from an initial position are free from collisions; and
  outputting, to a display device, a result of determining whether the one or more movement paths to arrive at the point of interest are free from collisions.

13. The method of claim 12, further comprising generating particular commands based on the one or more movement paths.

14. The method of claim 13, further comprising outputting the particular commands to a controller of a physical instance of the object, wherein the controller generates signals based on the particular commands, the signals indicative of a particular movement path of the one or more movement paths, outputs the signals to the physical instance of the object, and verifies that the physical instance of the object moves along the particular movement path indicated by the signals without experiencing a collision.

15. The method of claim 12, wherein the point of interest is related to a parameter of a first actuator of the actuators.

16. The method of claim 15, wherein the point of interest corresponds to a point near a boundary of a joint angle envelope of the first actuator.

17. The method of claim 12, further comprising:
identifying potential points of interest within the operational envelope; and
selecting a particular potential point of interest of the potential points of interest as the point of interest, wherein a position of the virtual model of the object that satisfies conditions of the particular potential point of interest overlaps with positions of the virtual model of the object that satisfies conditions of multiple potential points of interest of the potential points of interest.

18. A computer-readable storage device comprising instructions, that when executed, cause a processor to perform operations comprising:
determining a first motion envelope comprising a first plurality of points describing an object, wherein the object comprises portions including actuators and one or more components coupled to the actuators, and wherein the first plurality of points identifies a kinematic envelope of positions of particular portions of the portions which are achievable by activation of the actuators, wherein the first motion envelope is determined based on a Computer-Aided Design (CAD) model of the object, wherein the CAD model omits one or more components of the object that will not cause collisions, omits one or more flexible components of the object, replaces a curved surface of the object with a straight surface, removes an indention of a surface of the object, or a combination thereof;
determine a second motion envelope comprising a second plurality of points describing a range of motion of the particular portions constrained by dynamic motion limits of the object;
performing an intersect operation between the first motion envelope and the second motion envelope of the object to identify a third plurality of points identified by both the first motion envelope and the second motion envelope, the third plurality of points comprising fewer points than the first plurality of points, fewer points than the second plurality of points, or both;
determining an operational envelope of the object based on the third plurality of points, the operational envelope indicative of a range of motion of the object during operation of the object;
generating a virtual model of the object based on the operational envelope;
modeling operation of the object using the virtual model to determine whether a collision between a first portion of the object and a second portion of the object occurs along a motion path during operation of one or more of the actuators; and sending commands to the object to control movement of the object based on collision-free movement paths determined from use of the virtual model.

19. The computer-readable storage device of claim 18, wherein the operations further comprise identifying multiple points of interest within the operational envelope, and wherein each point of interest corresponds to a point near a boundary of the operational envelope.

20. The computer-readable storage device of claim 18, wherein the second motion envelope corresponds to a Vehicle Relative Dynamic Motion (VRDM) envelope, and wherein the operations further comprise:
receiving a VRDM limits table indicative of dynamic motion limits specified by design specifications; and
generating the VRDM envelope based on the VRDM limits table.

* * * * *